US008751049B2

(12) United States Patent
Linder et al.

(10) Patent No.: US 8,751,049 B2
(45) Date of Patent: Jun. 10, 2014

(54) KINETIC INPUT/OUTPUT

(75) Inventors: Natan Linder, Boston, MA (US);
Patricia Maes, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 478 days.

(21) Appl. No.: 13/114,587

(22) Filed: May 24, 2011

(65) Prior Publication Data

US 2011/0288964 A1     Nov. 24, 2011

Related U.S. Application Data

(60) Provisional application No. 61/347,790, filed on May 24, 2010.

(51) Int. Cl.
*G05B 15/00* (2006.01)

(52) U.S. Cl.
USPC ........... 700/264; 700/245; 700/246; 700/259; 345/156; 345/173; 345/175

(58) Field of Classification Search
USPC ......... 700/245, 246, 250, 253, 257, 258, 259, 700/264; 345/156, 168, 170, 175, 173; 361/679.21, 679.22, 679.23
See application file for complete search history.

(56) References Cited

U.S. PATENT DOCUMENTS

| | | | |
|---|---|---|---|
| 4,742,439 A | 5/1988 | Choate | |
| 7,264,377 B2 | 9/2007 | Cooper et al. | |
| 2007/0156157 A1* | 7/2007 | Nahum et al. | 606/130 |
| 2008/0065410 A1* | 3/2008 | Bloom et al. | 705/1 |
| 2008/0212840 A1 | 9/2008 | Shalom et al. | |
| 2009/0300535 A1* | 12/2009 | Skourup et al. | 715/773 |
| 2010/0161125 A1* | 6/2010 | Aoba et al. | 700/254 |
| 2010/0182136 A1* | 7/2010 | Pryor | 340/425.5 |
| 2010/0275719 A1* | 11/2010 | Ortmaier et al. | 74/490.01 |

FOREIGN PATENT DOCUMENTS

DE       102007055204    *  5/2009   ............... B25J 13/08

OTHER PUBLICATIONS

Matsushita et al., "HoloWall: Designing a Finger, Hand, Body, and Object Sensitive Wall", Oct. 1997, UIST '97.*
Underkoffler, J. et al., 1999, Emancipated pixels: real-world graphics in the luminous room. Proceedings of the 26th annual conference on Computer graphics and interactive techniques, SIGGRAPH '99, pp. 385-392, ACM Press/Addison-Wesley Publishing Co. New York, NY, USA 1999.

(Continued)

*Primary Examiner* — Khoi Tran
*Assistant Examiner* — Spencer Patton
(74) *Attorney, Agent, or Firm* — Stephen R. Otis

(57) ABSTRACT

In exemplary implementations of this invention, an input/output device ("Bulb") is attached to on an articulated, actuated robotic arm. The robotic arm can move the Bulb by translating it along three axes and by rotating it about the arm's base. In addition, the I/O can rotate about its own vertical axis. The Bulb comprises at least a pico-projector, two cameras, a depth sensor and an onboard computer. The onboard computer controls actuators in the robotic arm and Bulb that move the Bulb. It also processes visual data captured by the cameras in order to recognize objects or events, and to respond to them. This response may include changing the position of the Bulb or changing the parameters of an image projected by the pico-projector.

20 Claims, 22 Drawing Sheets

(56) References Cited

OTHER PUBLICATIONS

Underkoffler, J. et al., 1999, Urp: a luminous-tangible workbench for urban planning and design. Proceedings of the SIGCHI conference on Human Factors in Computing Systems, CHI '99, pp. 386-393, ACM New York, NY, USA 1999.

Pinhanez, C., 2001, The Everywhere Displays Projector: A Device to Create Ubiquitous Graphical Interfaces. Proceedings of International Conference on Ubiquitous Computing, Atlanta Georgia, USA, Sep. 30-Oct. 2, 2001, Ubicomp 2001, Lecture Notes in Computer Science vol. 2201, 2001, pp. 315-331.

Raskar, R., et al., 2003, iLamps: geometrically aware and self-configuring projectors. Proceedings of SIGGRAPH '03, ACM SIGGRAPH 2003 Papers, pp. 809-818, ACM New York, NY, USA 2003.

Wilson, A., 2005, PlayAnywhere: a compact interactive tabletop projection-vision system. Proceedings of the 18th annual ACM symposium on User interface software and technology, UIST '05, pp. 83-92, ACM New York, NY, USA 2005.

Hoffman, G., 2008, Ensemble: fluency and embodiment for robots acting with humans. PhD Thesis, Massachusetts Institute of Technology, 2008.

Kaplan, F., et al., 2009, Interpersonal Computers for Higher Education. Interactive Artifacts and Furniture Supporting Collaborative Work and Learning, Computer-Supported Collaborative Learning Series vol. 10, 2009, pp. 1-17.

Schoning, J., et al., 2009, Map torchlight: a mobile augmented reality camera projector unit. Proceedings of CHI EA '09, CHI '09 Extended Abstracts on Human Factors in Computing Systems, pp. 3841-3846, ACM New York, NY, USA 2009.

\* cited by examiner

KINETIC INPUT/OUTPUT

RELATED APPLICATIONS

This application claims the benefit of U.S. Provisional Application Ser. No. 61/347,790, filed May 24, 2010, the entire disclosure of which is herein incorporated by reference.

FIELD OF THE TECHNOLOGY

The present invention relates generally to input/output devices.

COMPUTER PROGRAM LISTING

The ASCII text file named Source_Code_20100524.txt, created May 24, 2010, with a size of 20,881 bytes (the attached "Source Code"), sets forth a computer program listing a prototype of this invention. That ASCII text file is incorporated by reference herein.

SUMMARY

In exemplary implementations of this invention, an input/output device ("I/O device") is attached to an articulated, actuated robotic arm. The I/O device can make itself move (by controlling actuators to change its position). When it moves, it can translate along three axes (up/down, sideways, and back and forth) and rotate about at least two rotational axes. This kinetic ability gives rise to novel functionalities that are discussed below.

The size and outer shape of the housing of the I/O device are similar to those of an ordinary light bulb. The size and outer shape of the robotic arm are similar to those of a conventional balanced-weight lamp arm, such as the arm of an Anglepoise® lamp. Accordingly, the I/O device is sometimes referred to as a "Bulb", and the I/O device and the robotic arm together are sometimes referred to collectively as a "Lamp".

However, the Bulb is no ordinary light bulb. Rather, the Bulb comprises at least a pico-projector, two cameras, a depth sensor and an onboard computer. The pico-projector can project multi-pixel images on surfaces in the Bulb's environment. The first camera is aligned with the pico-projector. The second camera is mounted on a servo motor that can change the angle at which the second camera is pointed. The onboard computer controls actuators to change the position of the Bulb. It also processes visual data captured by the cameras in order to recognize objects or events, and to respond to them. This response may include changing the position of the Bulb or changing the parameters of an image projected by the pico-projector.

Although the Lamp is portable, the base of the Lamp is situated in a fixed location during ordinary use.

The Lamp includes actuators, such as servo motors, that allow the position of Bulb to be changed. These actuators can translate the Bulb in 3 axes in 3D physical space and rotate it about at least two rotational axes. For example, actuators can cause the robotic arm to rotate on its base, and to bend at different joints in the robotic arm. In addition, an actuator in the Bulb can rotate it about its vertical axis (the vertical axis of the Bulb being the axis that would be vertical if the pico-projector is pointed straight down). The overall effect is that actuators in the Lamp can move the Bulb with at least five degrees of freedom.

These kinetic capabilities are highly advantageous, and give rise to novel functionality. Here are six examples:

FIRST EXAMPLE

The Lamp may search a cluttered desktop to find a surface on the desktop that is not cluttered, then move the Bulb closer to the uncluttered surface, and then project a multi-pixel image on the uncluttered surface. When projecting this image, the Lamp may select an orientation and size of the image that fits within the boundaries of the uncluttered surface.

SECOND EXAMPLE

A human user can direct the Lamp to project images on a new surface as follows: The user translates his or her hand, and then holds it still for a short period. The Lamp recognizes this gesture. In response, the Lamp moves the Bulb to a new position, by moving it for a distance, in a direction, or to a stopping point, indicated by the gesture. Then the Bulb projects an image from that new position unto a new surface. More generally, a wide range of novel interactions can be achieved by a kinetic Lamp, which can move in multiple degrees of freedom while outputting a dynamic projected display and responding to user gestures and touch.

THIRD EXAMPLE

The Lamp may both physically zoom and digitally zoom a projected image. The physical zoom is accomplished by moving the Bulb closer to, or further away from, the surface on which the image is being projected.

FOURTH EXAMPLE

The Lamp's ability to move can enhance its computer vision, so that it can correctly recognize the object and then project an interactive image that is appropriate for the recognized object. For example, the Lamp's computer vision may recognize an object in the Lamp's vicinity with only 70% confidence because the object (when viewed from the Lamp's perspective) has a profile or other features that could be presented by different types of objects. The Lamp may translate the Bulb, so that a camera in the Bulb can view the object from multiple angles. By observing the object from different perspectives, the Lamp may be able to recognize that object with a much higher level of confidence (say 99%).

FIFTH EXAMPLE

The kinetic capabilities of the Lamp can enhance the Lamp's ability to "scan" a document. For example, the Lamp may move the Bulb from a first position (in which the Bulb is remote from the document or its view of the document is obstructed) to a new position over a document. From that new position, the Lamp can illuminate the object to be scanned, cameras onboard the Bulb can capture an image of that document, and that image may be transmitted to a separate device (such as a remote computer) for storage or display.

SIXTH EXAMPLE

A user may make a gesture that the Lamp recognizes as an instruction to project images on a wall. In response, the Lamp may search to find an appropriate wall surface, then move the Bulb until is it optimally positioned for projecting onto that wall surface, and then project images on that surface.

In exemplary implementations, the Bulb can not only move to a new position, but also interact with its environment in many ways from that new position.

For example, from the new position, the Bulb can project a graphical user interface ("GUI") on a surface. A human user may interact with this projected GUI by touching it (i.e., by touching the surface upon which the GUI is projected). The projected GUI may include a projected image of a keyboard or keypad. The projected GUI may be used for many purposes, including to interact with a mobile phone, to view and send emails or other electronic messages, and to display ads and purchase objects.

Or, for example, the Bulb can recognize an object, move closer to the object, retrieve information from the Internet that is related to that object, and then project that information on or adjacent to that object.

The onboard computer can control the image projected by the pico-projector, in order to correct for a keystone effect.

Alternately, the Bulb may be attached to an actuated track mounted on a wall or ceiling, or may be simply screwed into a conventional lamp.

The above description of the present invention is just a summary. It is intended only to give a general introduction to some illustrative implementations of this invention. It does not describe all of the details of this invention. This invention may be implemented in many other ways.

BRIEF DESCRIPTION OF THE DRAWINGS

The above Figures illustrate some illustrative implementations of this invention. The above Figures do not show all of the details of this invention.

DETAILED DESCRIPTION

In exemplary embodiments of this invention, a kinetic augmented reality ("AR") system is implemented in a desk lamp's familiar form factor. This Lamp comprises a robotic arm and an input/ouput device ("Bulb") that is attached to one end of the arm.

The Lamp can move under its own power, with many degrees of freedom ("DOFs"). These kinetic capabilities allow the Lamp to reposition the Bulb. They also allow the Lamp to make expressive anthropomorphic gestures, such as a sad gesture (the lamp arm and head droop) or alert gesture (the lamp arm and head perk up). Such kinetic, anthropomorphic gestures by the Lamp can provide useful feedback to a human user.

The Bulb houses a pico-projector and conventional cameras. It may also house other sensors (e.g., IR or 3D cameras, range detectors, ambient light sensors, microphones) and output devices (e.g., IR emitters). The Lamp's actuated degrees of freedom are used to support different linear and rotational motion paths that allow the Bulb to extend and dynamically change the projection parameters.

In exemplary embodiments of this invention, the robotic arm of the Lamp imparts at least four DOFs. Each DOF has a motor, positional and torque sensors as well as motor control and power circuitry. As a result, the robotic arm is capable of force-controlled compliant motion.

Real-time feedback from cameras as well as additional sensors (e.g., positional encoders and range sensors) are used for motion control, in exemplary implementations of this invention. This supplements the motion feedback that occurs in the Lamp's servo motors.

Figure 1:
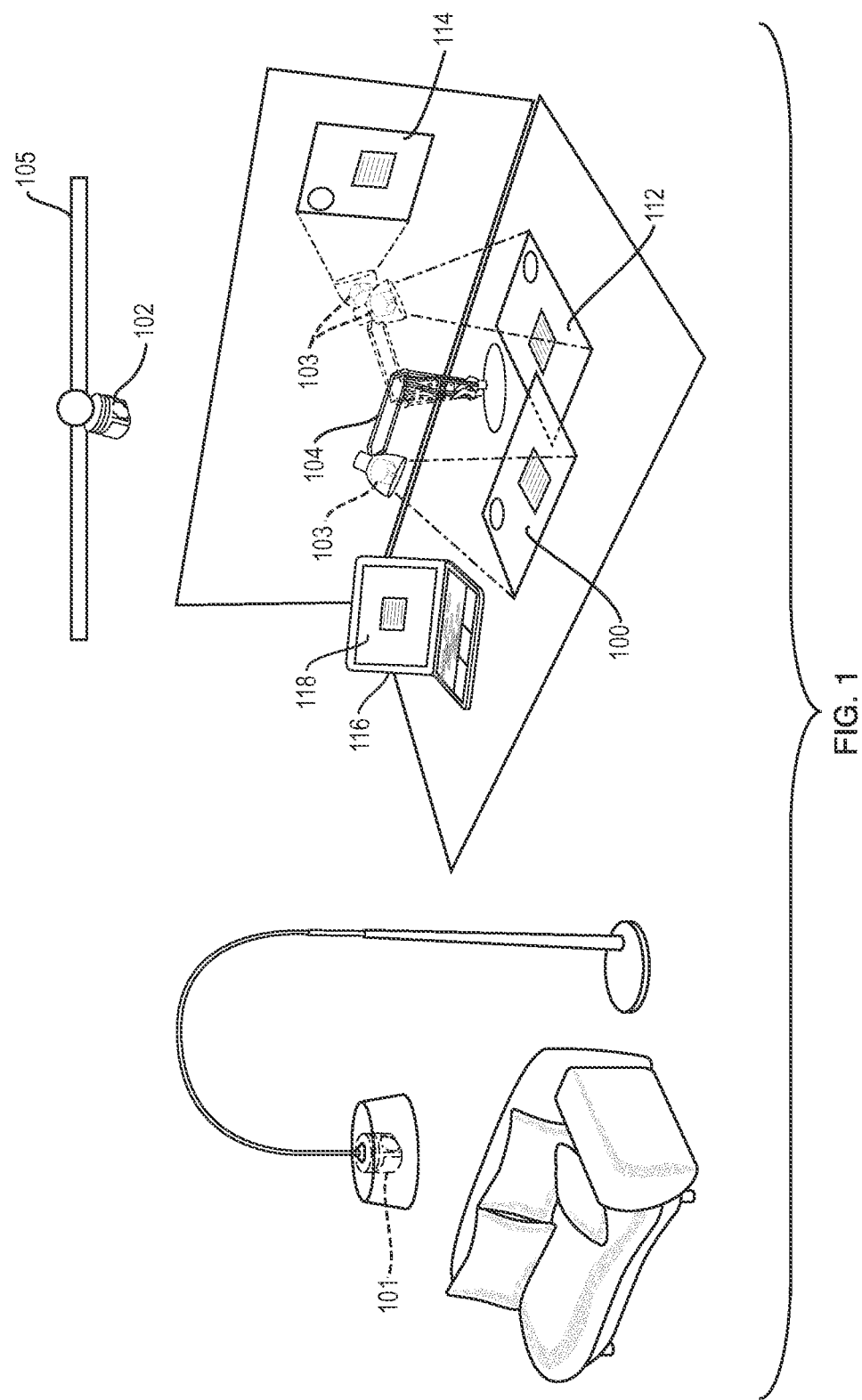
FIG. 1 shows three use scenarios for a Bulb: (1) attached to an articulated, actuated robotic arm, (2) attached to an actuated linear track, and (3) screwed into a conventional lamp socket.
Figure 2A:
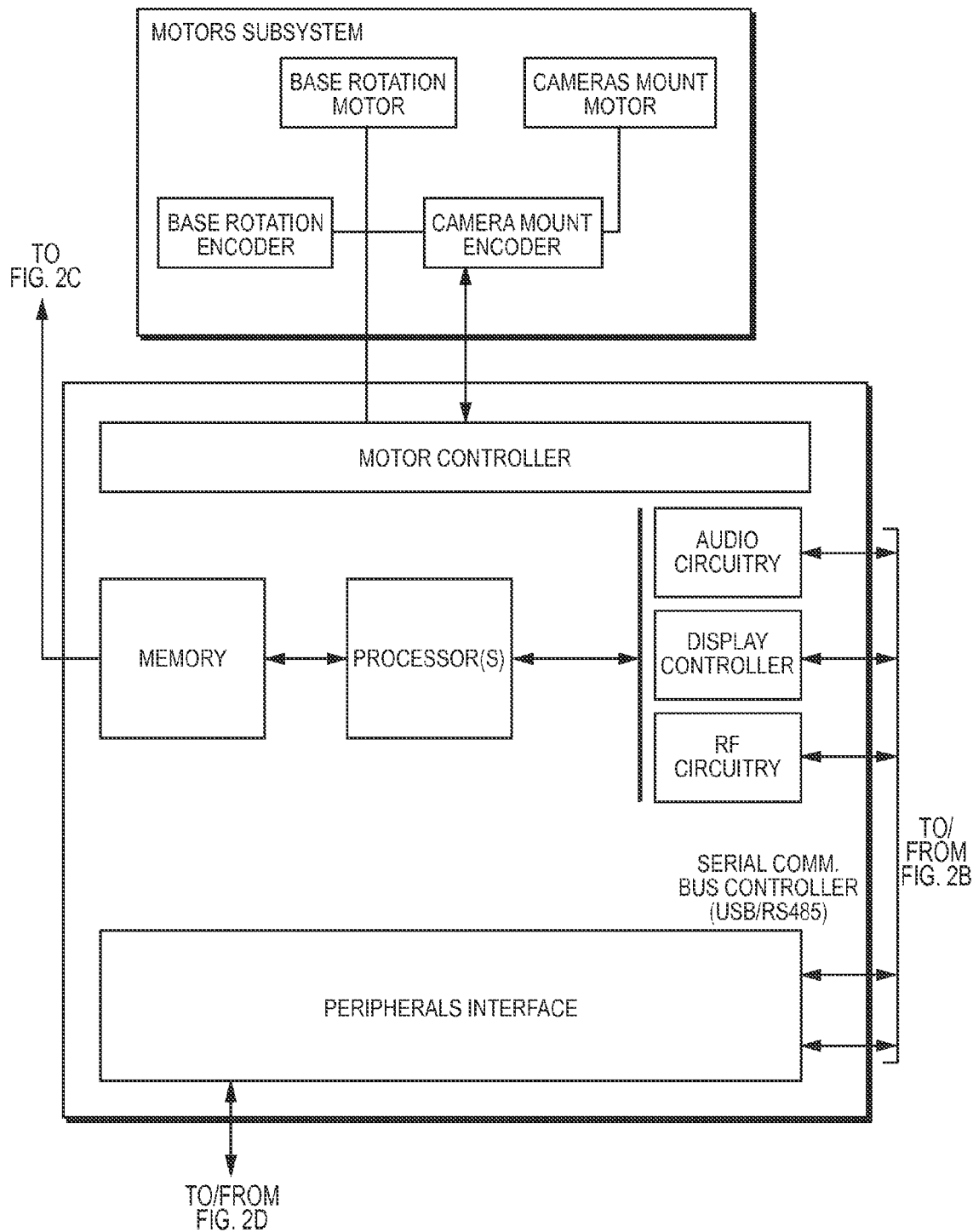
FIGS. 2A, 2B, 2C and 2D are a high level block diagram of hardware and software components comprising a Bulb.
Figure 2B:
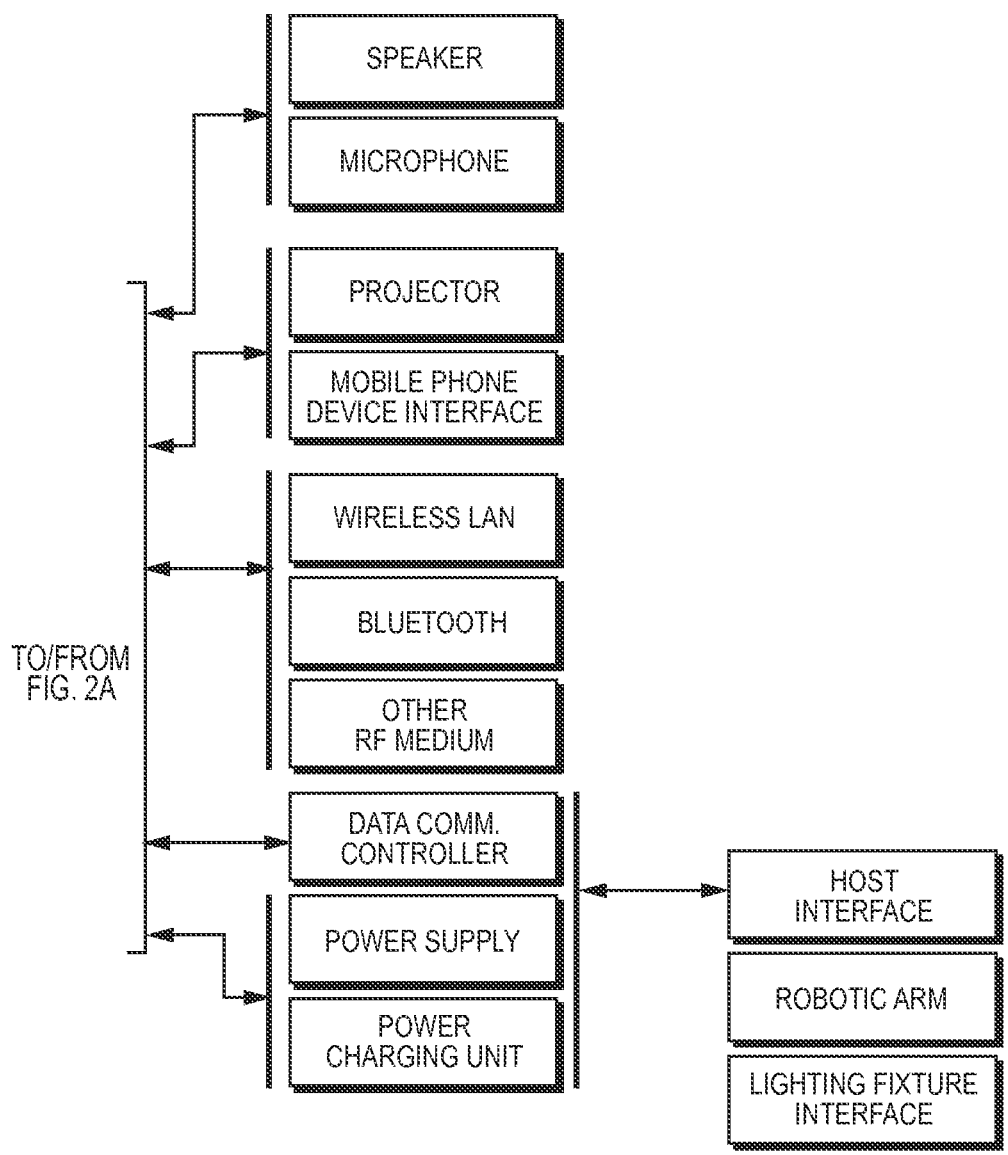
Figure 2C:
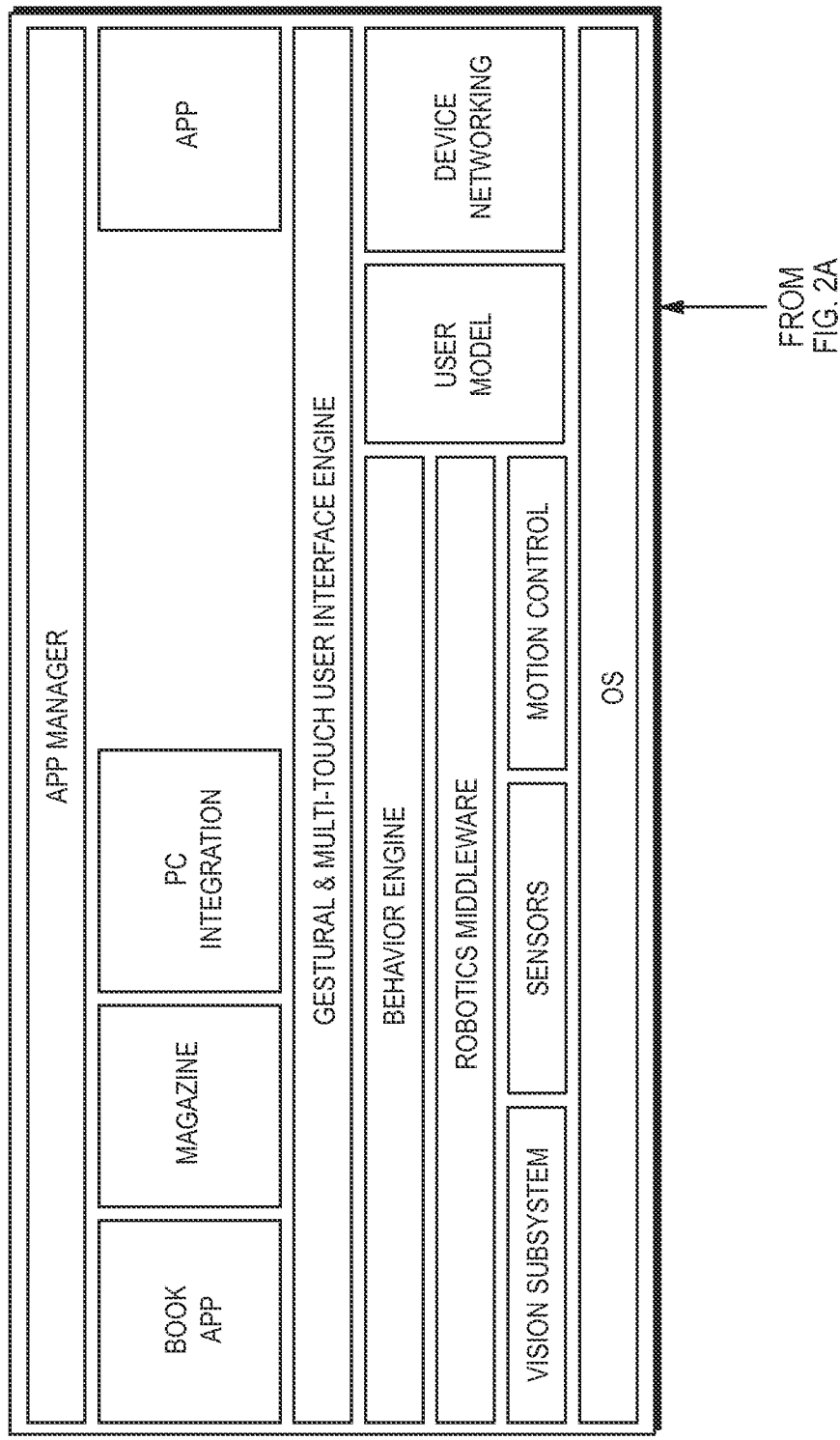
Figure 2D:
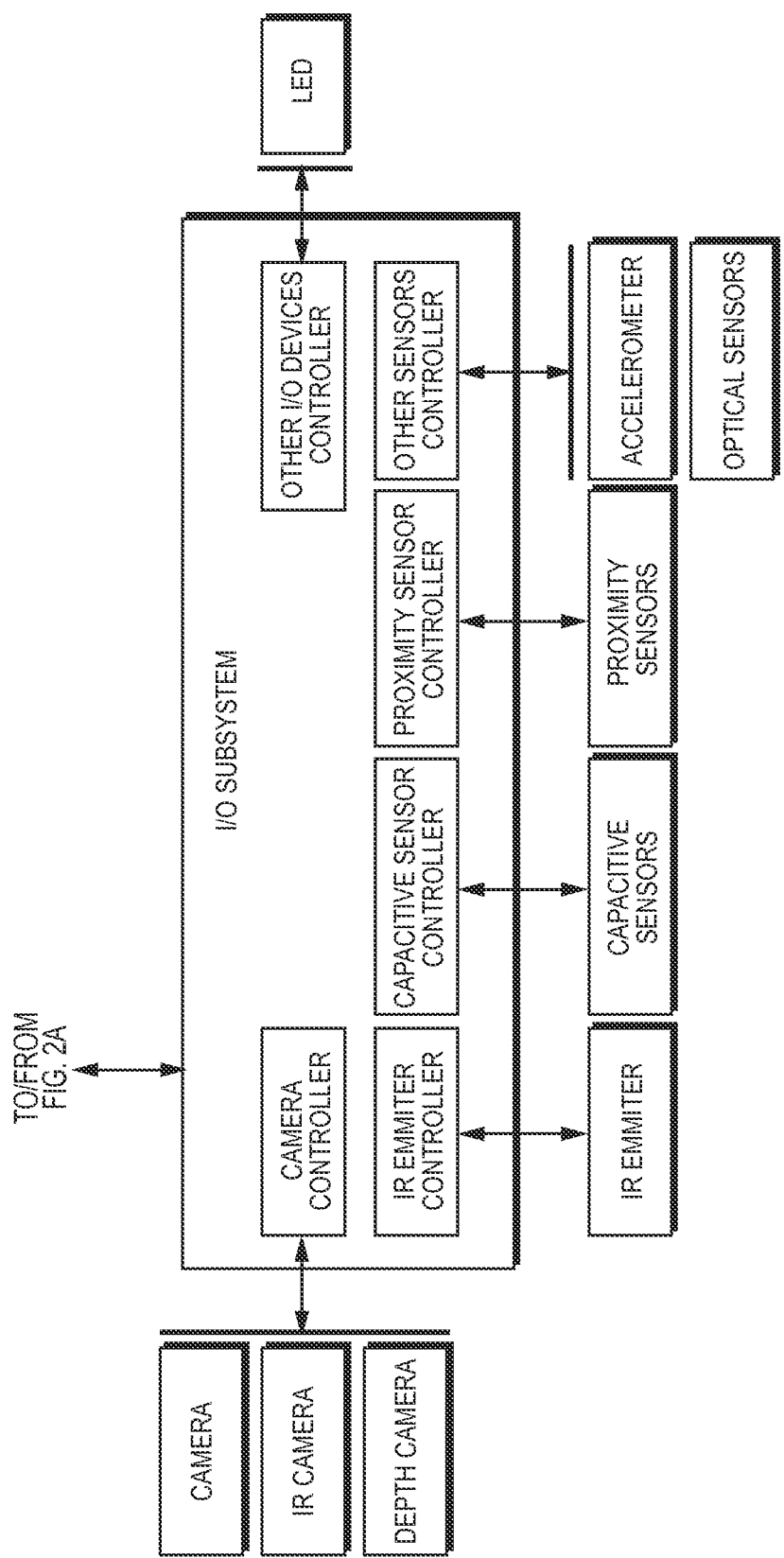

Although the Bulb may be attached to a robotic arm, other configurations are possible. FIG. 1 shows examples of three use scenarios for a Bulb: the Bulb may be (1) attached to an articulated, actuated robotic arm, (2) attached to an actuated linear track, and (3) screwed into a conventional lamp socket.

The first use case is shown in FIG. 1 (bottom right). A Bulb 103 is screwed into a socket of an articulated, actuated robotic arm 104. The Bulb 103 controls servo actuators in the Bulb 103 and robotic arm 104. By using these actuators, the Lamp can servo into different positions, allowing it to project images on different projection surfaces. For example, the Lamp can first project an image on one surface 100 of a physical desktop, then servo to different positions so that it projects images on different surface of the same physical desktop 112 or on a nearby wall 114. The Bulb 103 can interact with other devices, such as a laptop computer 116. For example, the Bulb 103 can transmit an image to the laptop computer 116, for storage or for display on the laptop's screen 118.

The second use case is shown in FIG. 1 (upper right). A Bulb 102 is attached to a head that can move along a linear track 105 and can tilt. The Bulb 102 can control actuators to control these motions.

The third use case in this example is shown in FIG. 1 (lower left). A Bulb 101 is screwed into a female socket of a conventional lamp. For example, the Bulb may have an Edison 27 mm male screw base. In this third use case, actuators in the Bulb 101 can rotate the Bulb 101 about its vertical axis, but the Bulb cannot otherwise cause actuators to change its position.

In all three use cases in this example, the Bulb 101, 102, 103 receives electrical power through an electrical contact between its male screw base and the socket into which it is screwed.

The pico-projector is generally used to project multi-pixel images. However, it can also be used to provide uniform (single pixel) illumination. Alternately, the Bulb may also house a conventional illumination source (e.g., an LED), which can be used for to provide conventional lighting.

In exemplary implementations of this invention, the Bulb's onboard computer can store and retrieve data in a database regarding the location of objects and potential projection surfaces in Bulb's vicinity. This data may include information regarding whether a specific projection surface is appropriate for a specific application, such as a projecting a user interface for looking at a photo album or sending emails. The onboard computer may have a dictionary of registered objects that it is capable of detecting and classifying. Additionally, the onboard computer may have a database and lookup function that defines the physical location of certain applications in the workspace with respect to the lamp position.

FIGS. 2A, 2B, 2C and 2D comprise a high level block diagram of hardware and software components comprising a Bulb, in an illustrative implementation of this invention.

Figure 3:
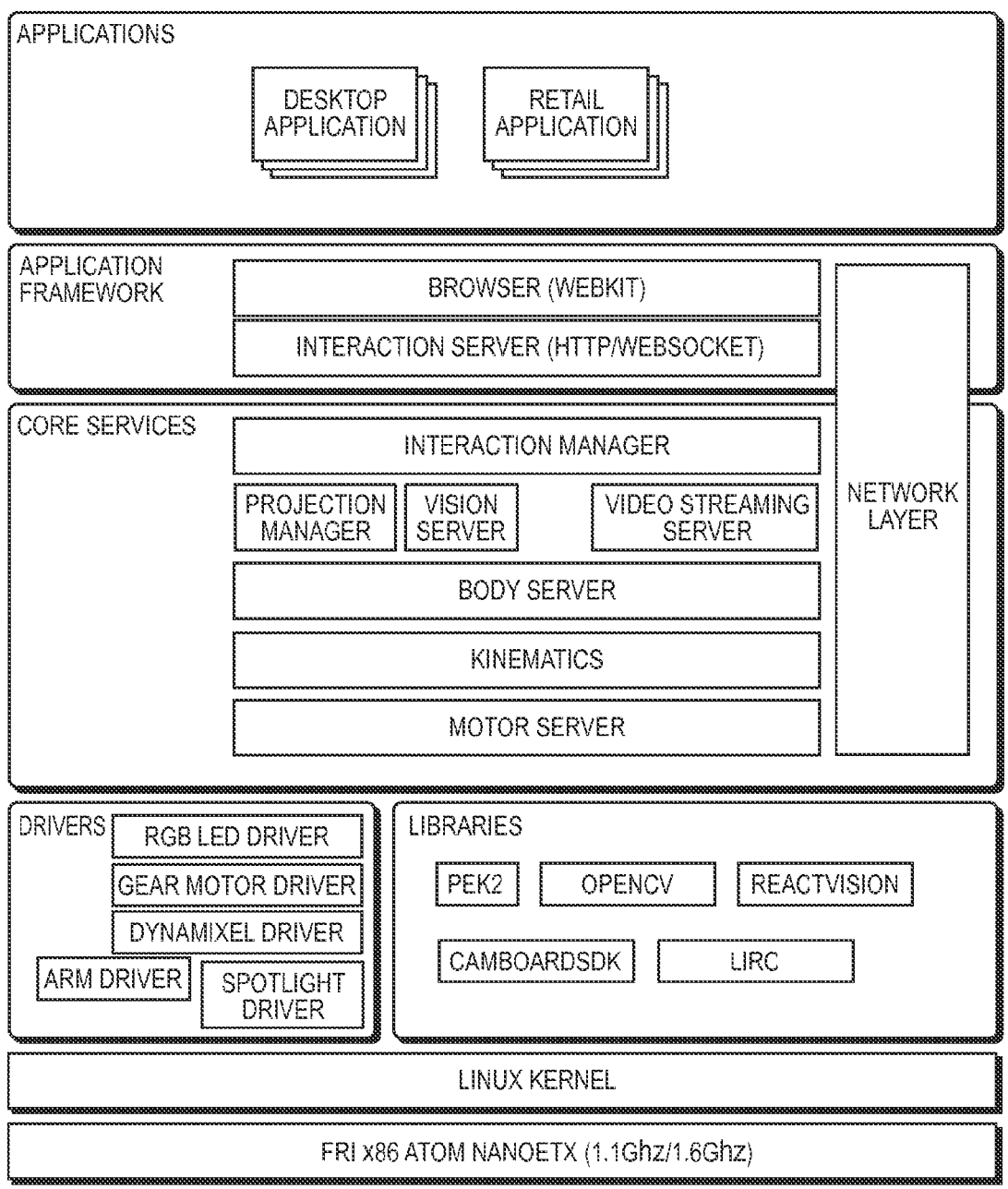
FIG. 3 is a system diagram of a software stack employed by a Bulb.

FIG. 3 is a system diagram of a software stack employed by the Bulb, in an illustrative implementation of this invention.

Figure 4:
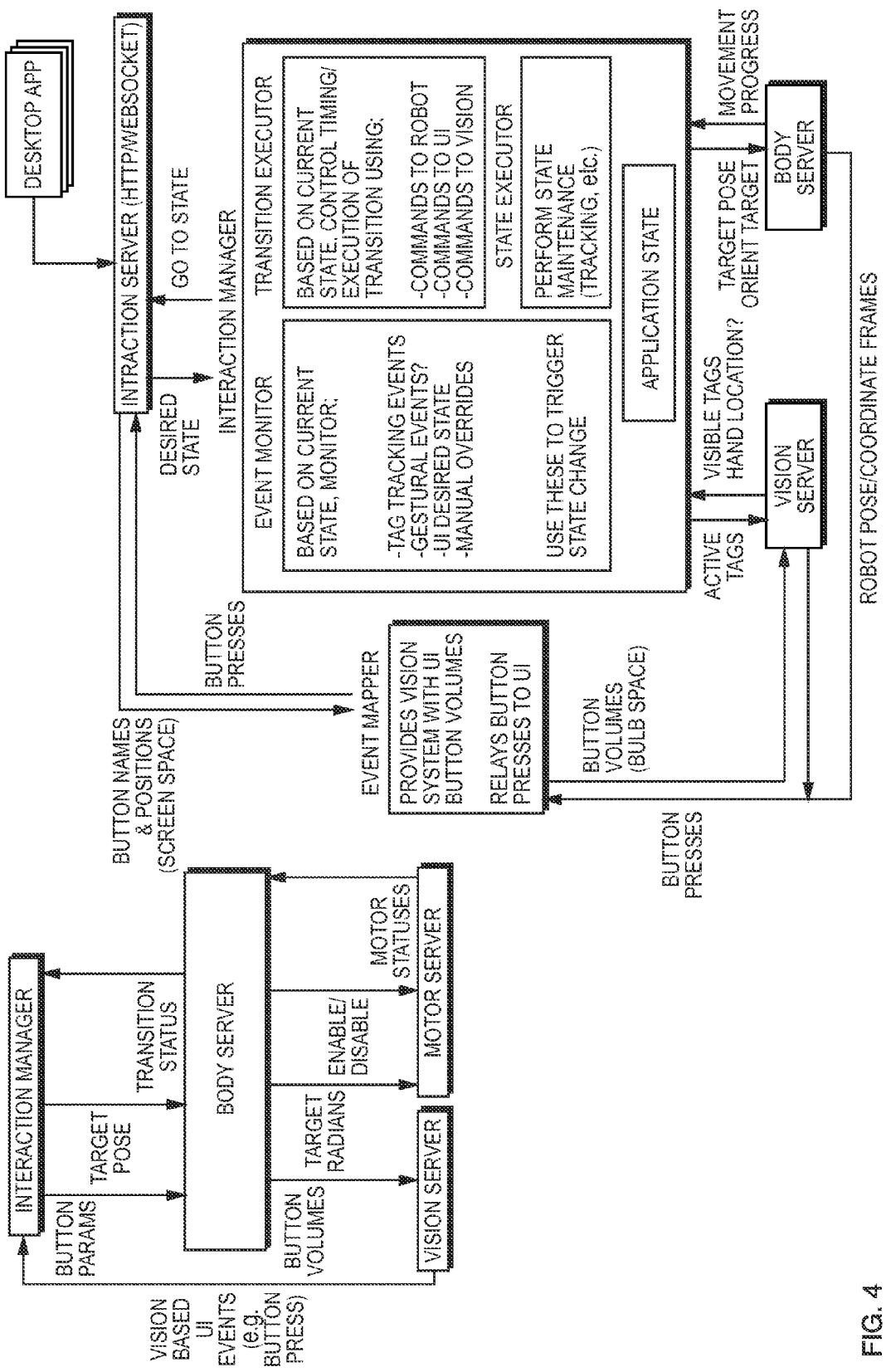
FIG. 4 is a flow chart of the high level functionality of an augmented reality user interface employed by a Lamp.

FIG. 4 is a flow chart of the high level functionality of an augmented reality user interface ("UI"), in an illustrative implementation of this invention.

Figure 5:
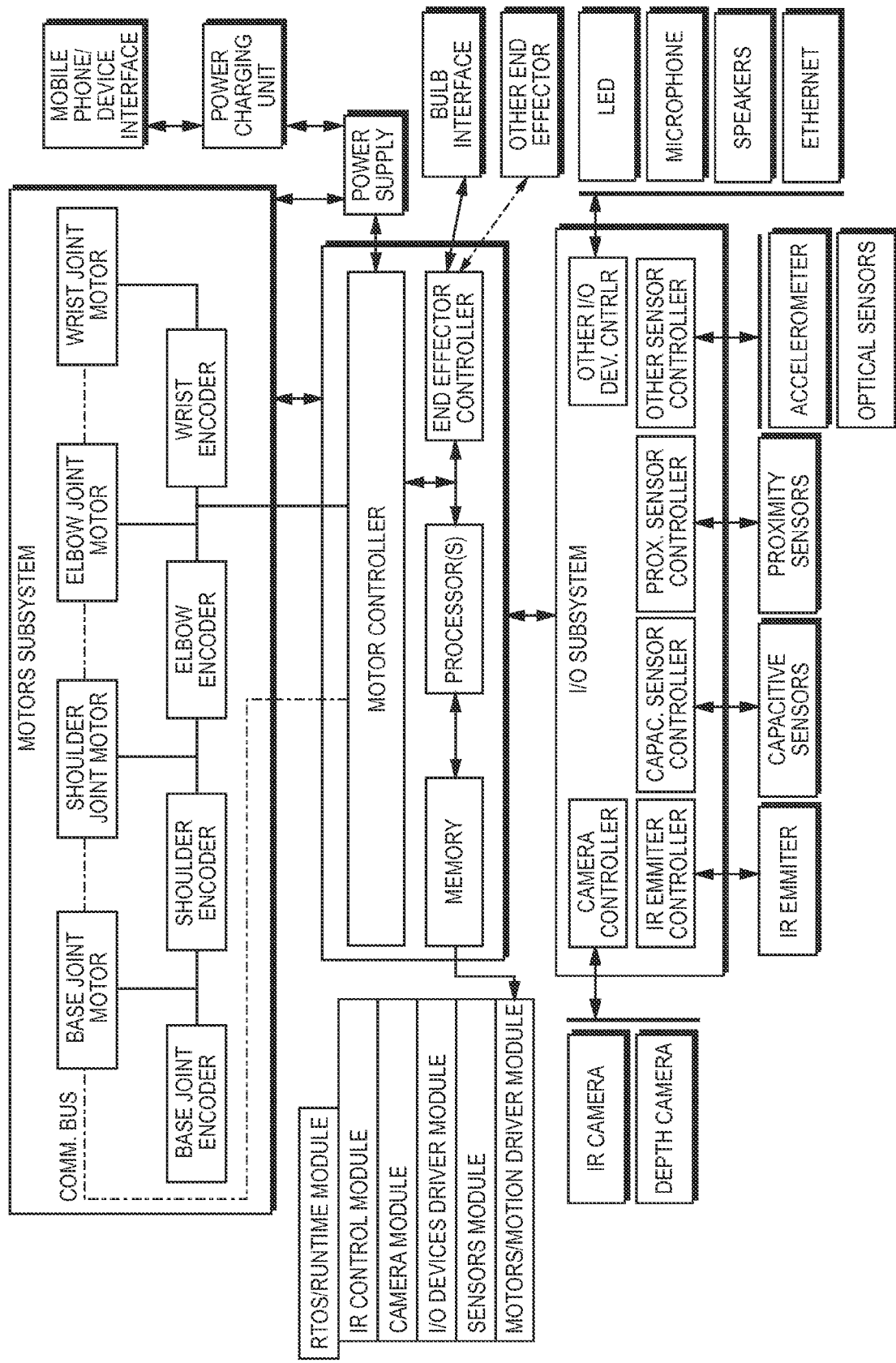
FIG. 5 is a high level block diagram of hardware and software components comprising a robotic arm in a Lamp.

FIG. 5 is a high level block diagram of hardware and software components comprising a robotic arm in a Lamp, in an illustrative implementation of this invention.

Figure 6:
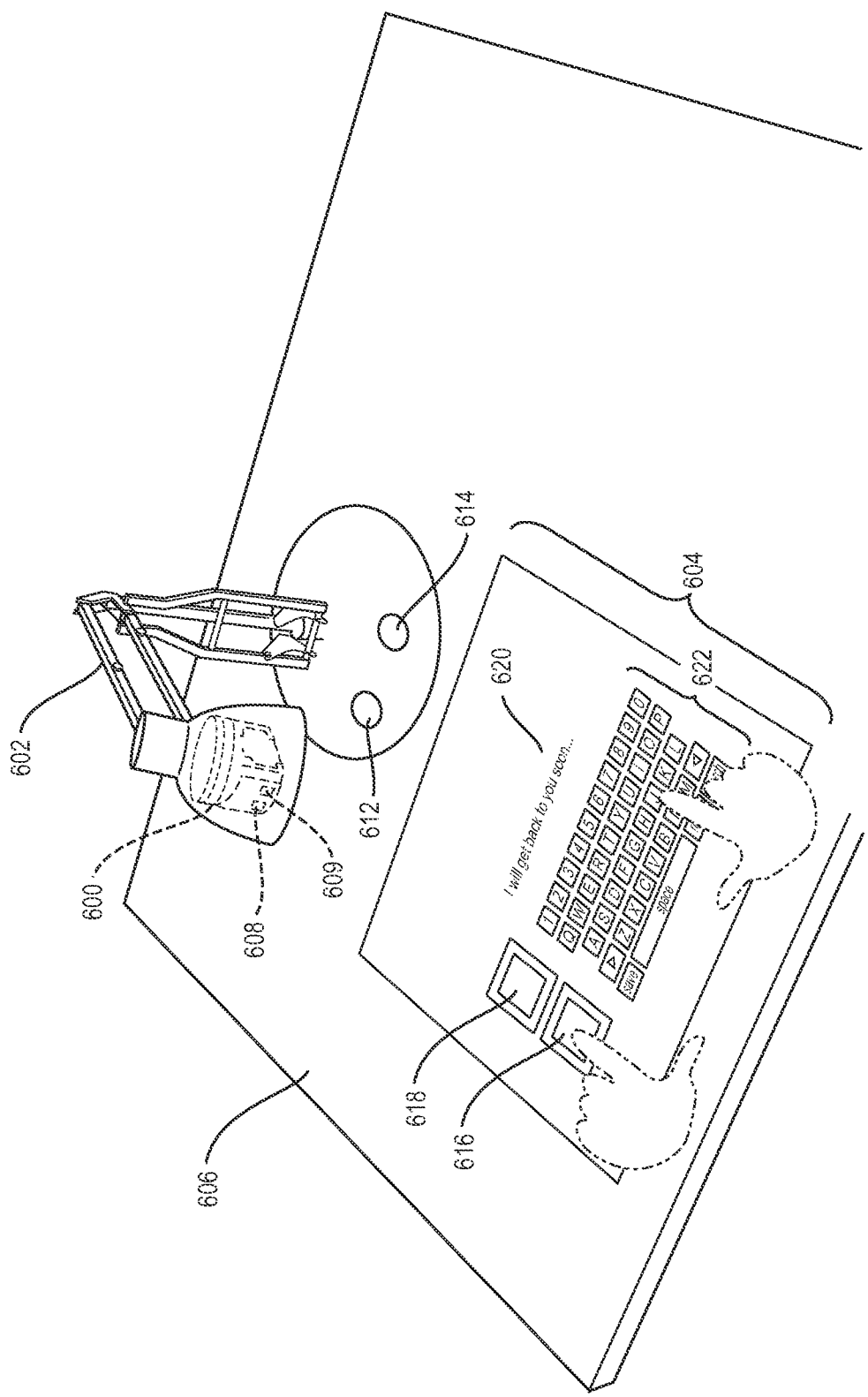
FIG. 6 shows a Lamp projecting a graphical user interface on a surface.

FIG. 6 shows a Lamp projecting a graphical user interface ("GUI") 604 on a projection surface. A human user can interact with the GUI by touching that surface, in an illustrative implementation of this invention. In the example shown in FIG. 6, the GUI is projected on a physical desktop 606. A Bulb 600 is attached to a robotic arm 602. The Bulb 600 includes an infrared emitter 608 and infrared camera 609. The infrared emitter 608 floods the projection surface 604 with an infrared light plain. The infrared camera 609 can detect when the infrared plain is penetrated by the users hands or fingers, and thus detect input gestures. The location of inanimate objects in the IR light plain can also be determined. The base of the robotic arm 602 includes a microphone 612 and three-axis accelerometer 614. Alternately, an inertial measurement unit ("IMU") may be used instead of the accelerometer 614. For example, the IMU may comprise a 3-axes accelerometer and gyroscopes to measure changes in angular orientation about 3 axes. In addition, the 3D location of the Bulb in space can be deduced from the Lamp's robotic arm DOFs positions.

In FIG. 6, user interface events are detected by the Lamp's computer vision system, using hand tracking combined with IR reflection or depth sensing analysis. The Lamp's camera and projector are calibrated to the projected surface.

FIG. 6 shows an example of a just-in-time-and-place information retrieval and manipulation, in an illustrative implementation of this invention. In this example, notification icons 616, 618 are displayed for Email and Twitter® feeds, respectively. When the user 616 touches the icon the message 620 appears. The user may choose to reply to the message 620 using a projected QWERTY keypad or keyboard 622. The locations of the projected interfaces 616, 618, 620, 622 are retrieved from a database stored in the onboard computer of the Bulb 600.

FIGS. 7A, 7B, 7C and 7D show examples of ways that a user can cause a Lamp to change its position, in illustrative implementations of this invention.

Figure 7B:
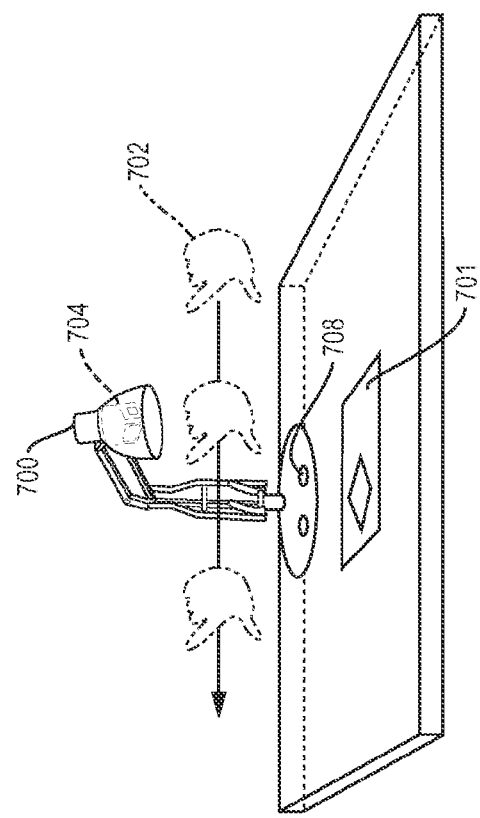
FIG. 7A shows a Lamp after it has changed position in response to a gesture by a human user. The gesture is shown in FIG. 7B.
FIG. 7C shows a Lamp after a user has moved it by direct physical manipulation.
FIG. 7D shows a user grasping a Lamp to move it in that manner.
Figure 7A:
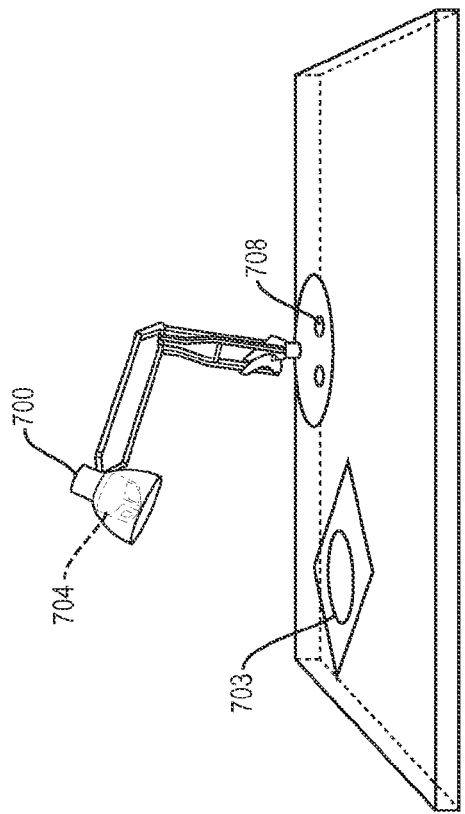

In the sequence shown in FIGS. 7A and 7B, a Lamp 700 includes a Bulb 704 that initially projects an image on a projection surface 701. A user 702 makes a gesture by translating his hand and then holding the hand still for a short period (e.g., 1-2 seconds). The Lamp's computer vision system recognizes both the translation of the hand and the hand hover. For example, the Lamp may interpret the user's hand hover (holding the hand still for 1-2 seconds) as a directive that indicates the end position for the desired motion. In response to this gesture, the Lamp 700 moves the Bulb 704 to a new position, by moving it for a distance, in a direction, or to a stopping point, indicated by the gesture. Then the Bulb 704 projects an image from that new position unto a new projection surface 703.

Figure 7D:
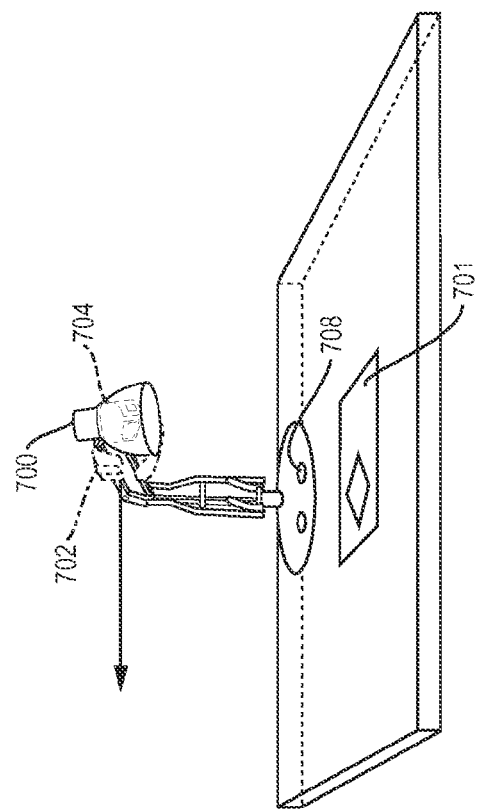
Figure 7C:
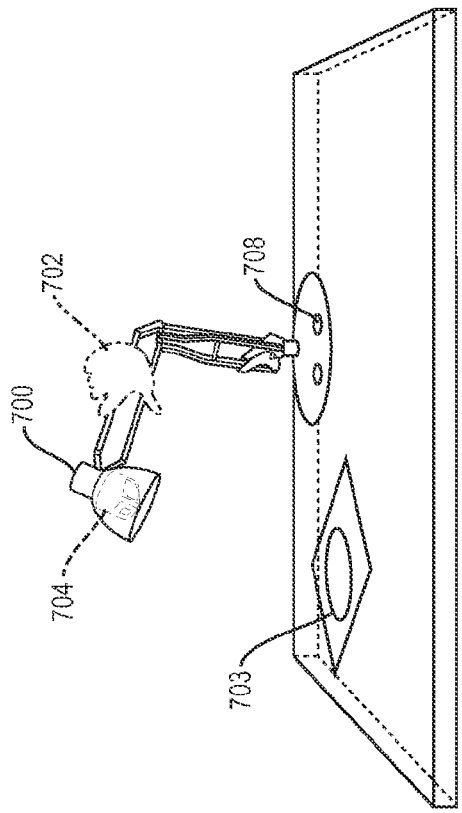

In the sequence shown in FIGS. 7C and 7D, a user moves a Lamp by grasping it and directly physically manipulating it. Capacitive sensors detect that the Lamp is being grasped by a human user. In response, the Lamp "unlocks" its position, allowing the user to move it easily. When the user lets go, this too is detected by capacitive sensors, and the Lamp "locks" position again. The capacitive sensors may be positioned in various places on the Lamp. For example, capacitive sensors 708 may be located in the base of the lamp with electrode leads to the robotic arm of the Lamp, to detect changes in capacitance at various points on the robotic arm.

A wide variety of kinetic hand gestures (in which the user moves his or her hands or fingers) may be used for input, in an illustrative implementation of this invention. Here are some examples: (A) The "track-position" gesture (such as that shown in FIG. 7B) can be used to position an interface element in a desired location and possibly record it. The user simply moves his hand in a desired direction and then stops, holding his hand still for 1-2 seconds to stop the motion. (B) The "corner" gesture can be used to manipulate the zoom factor and orientation of the projection. The user touches two corners of a projected object with the user's index fingers. To zoom in or out, the user moves his index fingers closer together or further apart, and the corners correspondingly move in or out. To change the orientation, the user rotates both of his index fingers, and the corners of the object correspondingly rotate. The zoom may be achieved by either spatial zoom (by mechanical motion of the Lamp) or conventional digital content zoom, or a combination of the two. (C) The "rotate" gesture requires one pivot point and a circular motion relative to the motion that defines an orientation angle, the result is a projection with the change in orientation. This gesture can also implement shortcut gesture for changing the projection orientation form portrait to landscape. (D) The "focus-tap" gesture is a single click zoom-in-location operation. The user simply taps and holds or double taps a point of interest; in response, the Lamp zooms on the desired location. (E) The "close-swipe gesture" allows a user to close a projection surface by swiping diagonally across two points. (F) The "swipe-unlock" gesture allows a user to unlock the lamp by swiping his hand under the Lamp.

Figure 8:
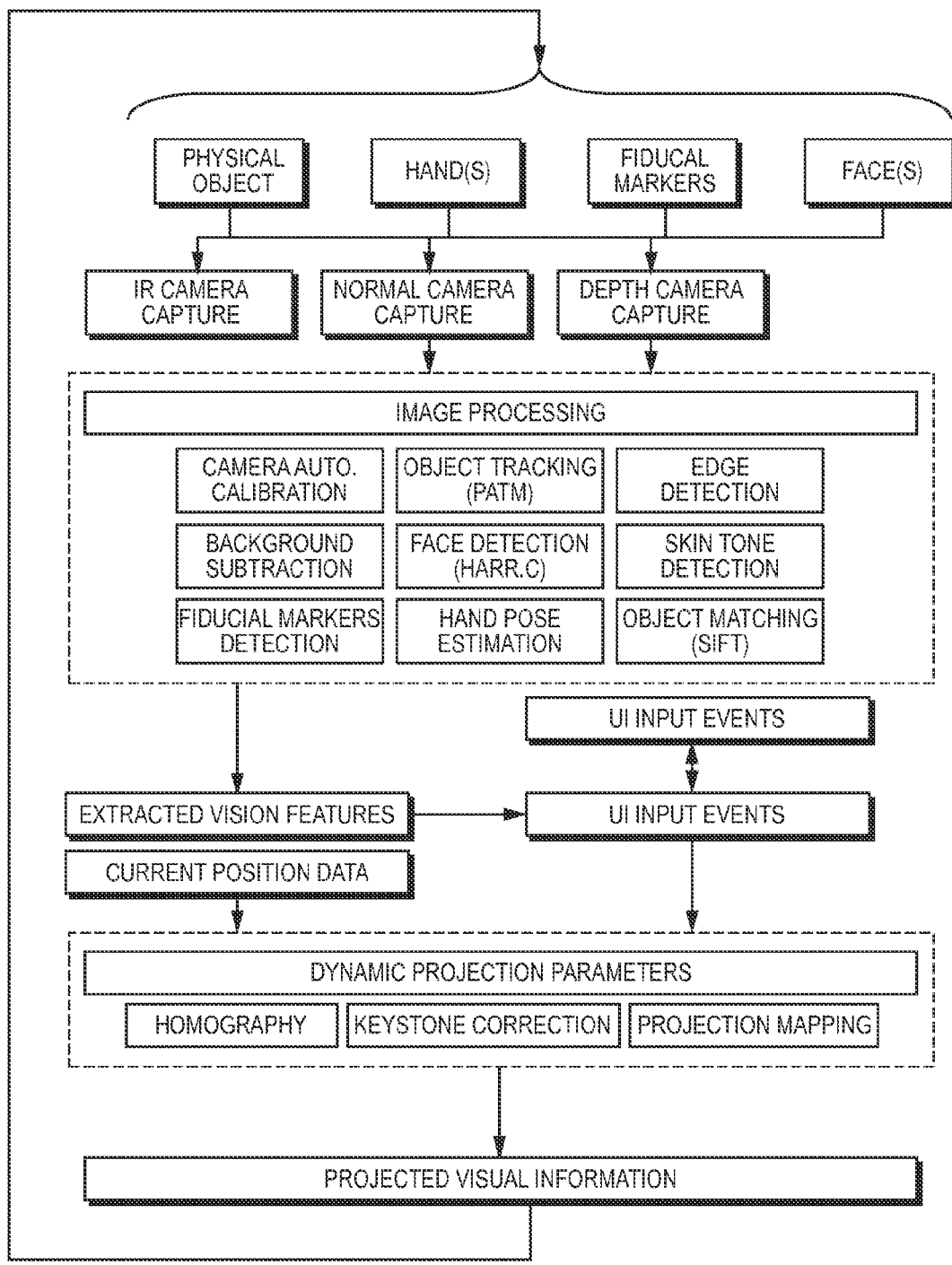
FIG. 8 is a high level diagram of the functionality of a vision subsystem for a Bulb.

FIG. 8 is a high level diagram of the functionality of the vision subsystem for a Bulb, in an illustrative implementation of this invention. In this example: Real time video capture at 15+fps is streamed to the vision subsystem. Frames are buffered and go through different processing steps. The vision subsystem performs the listed images processing and generates a vector of extracted vision features. The UI Engine generates events based on the application manager requirements per the current application that is in view. In addition to the UI Input Events, additional position data from the robotic subsystems of the Bulb and/or the Lamp arm are integrated to generate the required projection. The UI Engine generates the required data for the visual information projection. The output is calibrated per positional data and the vision features vectors. The system continuously calibrates using a feedback loop.

Figure 9:
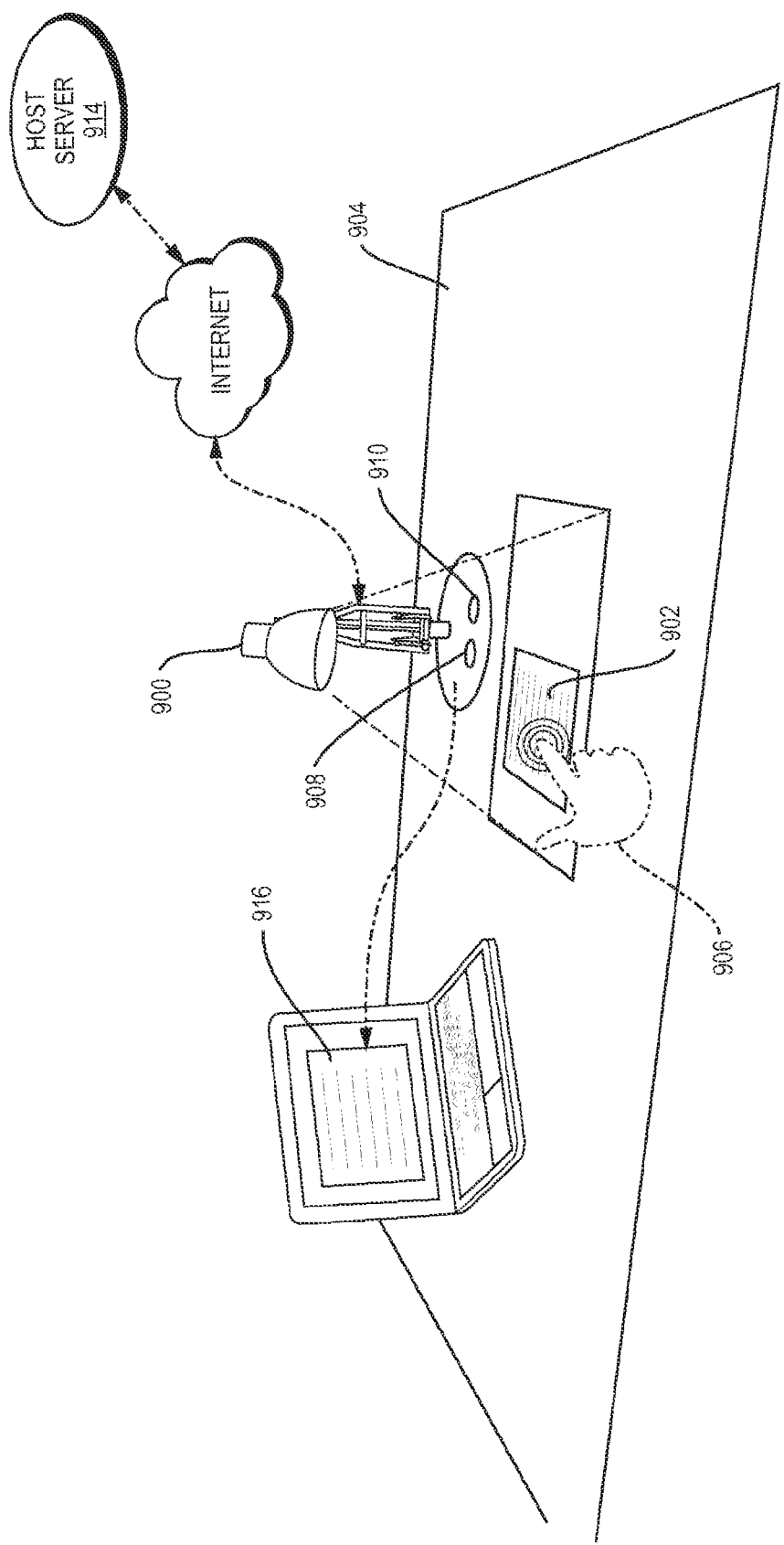
FIG. 9 shows an example of the Lamp scanning a document and transmitting it to a personal computer or a host server of a web service.

FIG. 9 shows an example of the Lamp being employed to scan a document and transmit it to a personal computer or a host server of a web service, in an illustrative implementation of this invention. In this example, a user 906 places a document 902 on a physical desktop 904 under a Lamp 900. Next, the user 906 taps the document 902 twice as if performing a double-click operation. The Lamp then scans and transmits the document to the user's computer 916 or via the Internet to a host server 914 of a desired web service. Multiple sensors in the Lamp are used to detect the tapping. These sensors include a camera in the Bulb, a microphone 908 and a 3-axes accelerometer 910. The microphone 908 and accelerometer, 910 may, for example, be embedded in the base of the Lamp. After an image of the document 112 is transmitted to a computer 916, that image may be stored in the computer's memory or displayed on that computer's screen.

Figure 10:
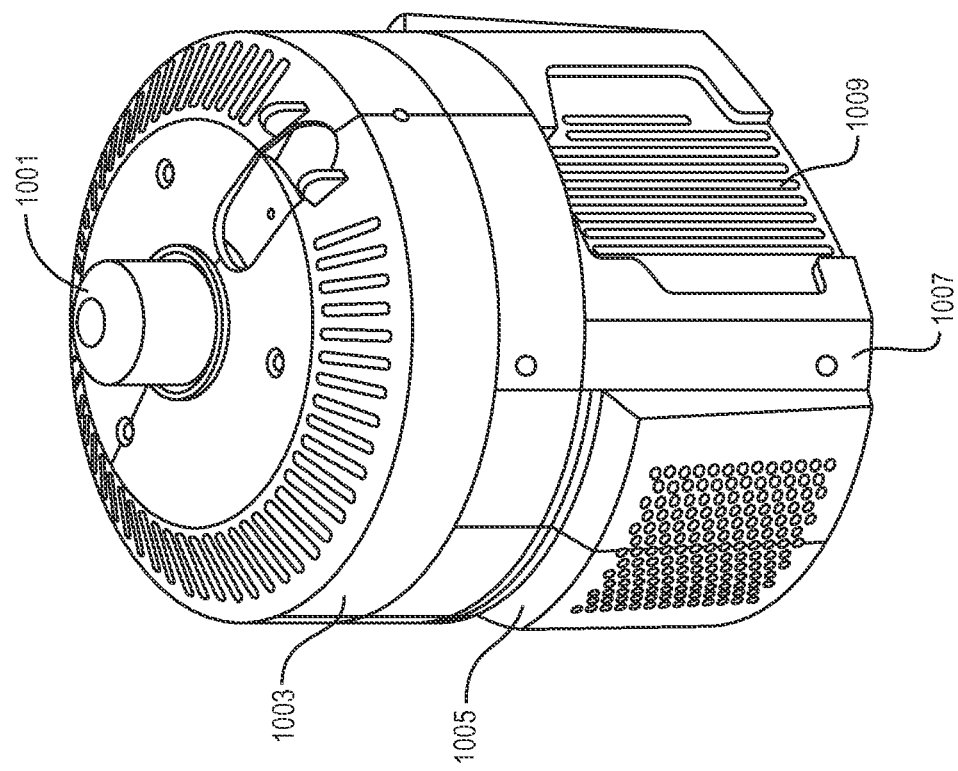
FIG. 10 shows a perspective view of a Bulb.

FIG. 10 shows a perspective view of a Bulb, in an illustrative implementation of this invention. A male screw base 1001 (e.g. with an Edison 27 mm shape) allows the Bulb to be screwed into a female socket. This allows the Bulb to be attached, for example, to a robotic arm, to an actuated track or to a conventional lamp. The outer housing of the Bulb includes a top cover 1003, a side cover 1005 with embedded computer heat sink, and a pico-projector heat sink cover 1007. A pico-projector heat sink 1009 is visible on the Bulb's exterior.

Figure 11:
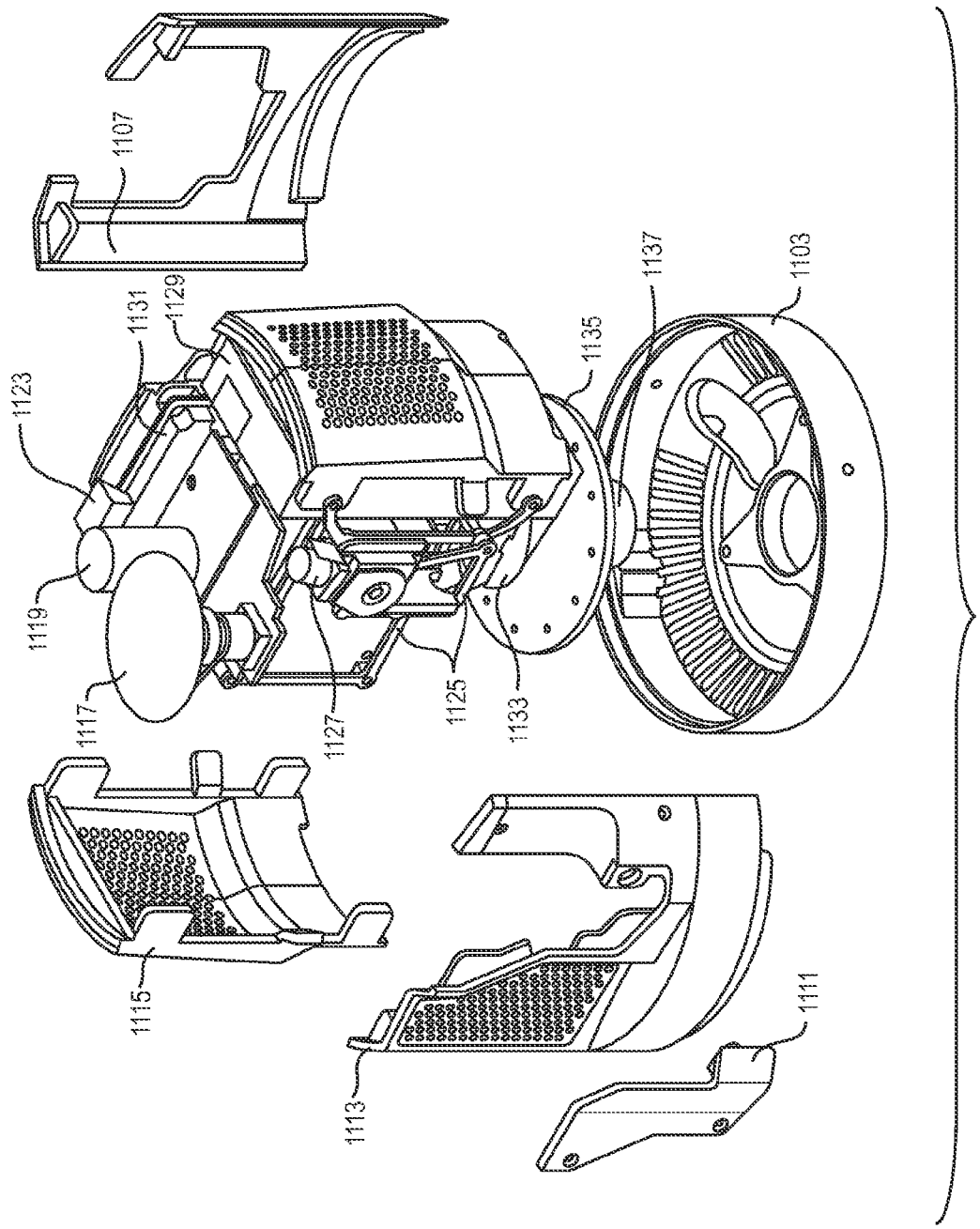
FIG. 11 shows an exploded view of a Bulb.

FIG. 11 shows an exploded view of a Bulb, in an illustrative implementation of this invention. The Bulb includes a pico-projector 1131, pico-projector aligned camera 1117, servo-mounted camera 1127, depth sensor, onboard computer 1129, an actuator 1133, heat sinks and housing.

In the example shown in FIG. 11, the pico-projector1131 can project multi-pixel images on projection surfaces in the vicinity of the Bulb (in FIG. 11, a beam of light 1123 emerges from the pico-projector 1131). The pico-projector aligned camera 1117 and servo-mounted camera 1127 can capture visual data not only for application purposes (e.g. teleconferencing or scanning a document) but also for dynamically controlling projection parameters (e.g. keystone correction, homographic calibration of the projection surface with the camera view-port). The angular orientation of the servo-mounted camera 1127 can be modified by its servo motors, allowing that camera to capture visual data from objects that are not in the line-of-sight of the pico-projector aligned camera 1117. This ability to swivel the servo-mounted camera 1127 is advantageous, because it allows the Bulb to visually explore different areas of its environment without changing the overall position of the Bulb.

The depth sensor 1119 is used to measure distance between the Bulb and another item. Thus, the depth sensor 1119 can assist in detecting, recognizing and tracking projection surfaces, objects and gestures. The depth sensor may comprise, for example, a flash lidar sensor, a time of flight camera, or another device that can provide image and depth information for each pixel at framerate.

The onboard computer 1129 can control actuators to change the position of the Bulb. It can also process visual data captured by the cameras in order to recognize objects or events, and to respond to them. This response may include changing the position of the Bulb or changing the parameters of an image projected by the pico-projector.

These components are mounted on a light aluminum frame 1125 that can rotate about a central shaft. The frame 1125 also acts as a heat sink for devices that are attached to it.

By itself, the Bulb has one degree of freedom: a rotation about its vertical axis. A gear motor, pulley and rotational encoder enclosure 1133 actuate the rotation of a central shaft aligned with the Bulb's vertical axis. The shaft is fixed through a big flange 1135 to the bulb socket screw 1137. The rotational motion generated by the gear motor is transmitted through a belt drive.

The Bulb is enclosed in several shells: one "fixed" shell attached to the main shaft flange 1135, and the rest of the shells connected to the aluminum frame 1125. The "fixed" shell comprises top cover 1103, pico-projector heat sink cover 1107 and side covers 1111, 1113, 1115.

The pico-projector and the onboard computer both have heat sinks used as part of the bulb shell.

Figure 12:
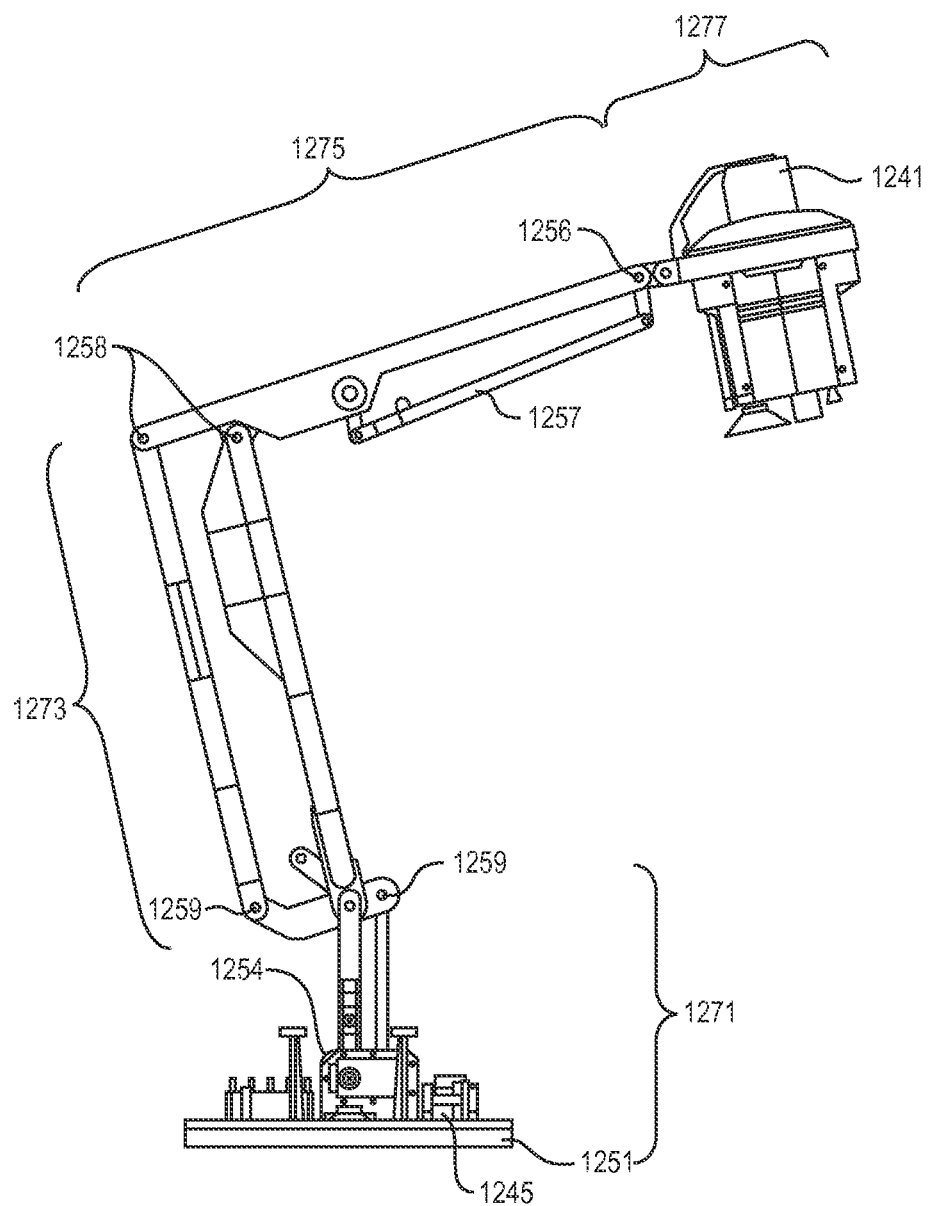
FIG. 12 shows a side view of a Lamp.

FIG. 12 shows a side view of a Lamp, in an illustrative implementation of this invention. In the example shown in FIG. 12, the Lamp includes an articulated robotic arm. The arm has three joints (a wrist pivot 1257, elbow pivot 1258 and shoulder pivot 1259) dividing it into a base 1271, lower arm 1273, upper arm 1275, and head 1277. In addition, the arm's base 1271 rotates around its vertical axis. Thus, the robotic arm provides a total of four degrees of freedom. The head 1277 connects to the Bulb through a standard female Edison 27 mm socket screw 1241.

The robotic arm uses a forward and inverse kinematics model and solution based on its joint and links position. In an illustrative implementation of this invention, the solution is fed to the motor control subsystems and used by the UI Engine to dynamically control the projection parameters with respect to the arm's location and orientation in a three-dimensional space.

In the example shown in FIG. 12, the arm's base consists of two plates separated by a ring of ball bearings and connected by a shoulder screw. The top plate 1251 houses three servo motors: one for the base rotation, one for the lower arm tilt, and one for the upper arm tilt. The base servo motor 1245 uses a pair of gears to transmit the motion, the lower arm tilt servo motor 1254 uses a four-bar linkage, and the upper arm tilt servo motor uses two four bar linkages. A fourth servo (the head tilt servo motor) is mounted in the middle of the upper arm and uses another four bar linkage. The head connects to the wrist servo horn 1256. Alternately, a head tilt servo motor may be mounted at the end of the upper arm 1275 and the head connected directly to the servo horn.

In the example shown in FIG. 12, the arm's servo motors actuate a total of four degrees of freedom as follows: (a) base servo (rotation about base's vertical axis DOF), and (b) one DOF for each of the shoulder servo, elbow servo, and head tilt servo.

This invention is not limited to this particular configuration of the robotic arm, but can be used with any articulated, motion-actuated device. The types of connections and actuators may vary. Also, the number of DOFs achieved is not limited to five, but may instead by any other positive integer. For example, with more or different types of connections, the number of DOFs imparted by the connections might be six, seven, eight or more.

Figure 13:
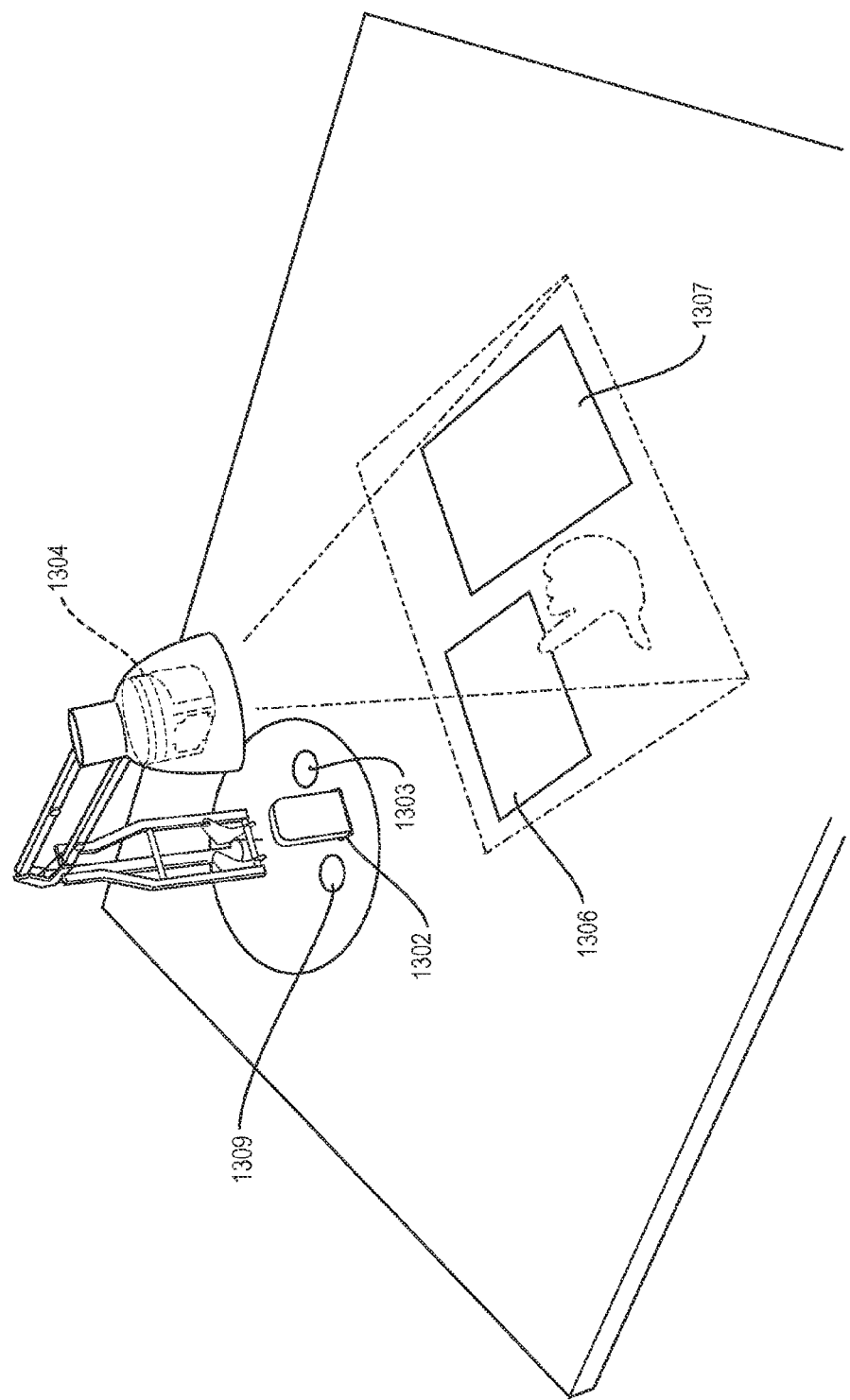
FIG. 13 shows a mobile phone charging in a cradle on a Lamp's base, while it projects a calculator GUI and also projects a notification of an incoming call.

FIG. 13 shows a Lamp being used with a mobile phone, in an illustrative implementation of this invention. The mobile phone rests in a cradle 1302 on a Lamp's base. When the phone is in the cradle, a wired connection may provide power to the phone and allow data exchange between the phone and the Lamp. Alternately, the phone and Lamp may exchange data wirelessly. In either case, the data exchange allows a human user to interact with both devices at the same time.

In the example shown in FIG. 13, the Bulb 1304 projects a calculator GUI 1306. While the user is interacting with that calculator GUI 1306, a phone call comes in. The Bulb projects a phone GUI 1307 that includes an incoming call notification. If the user chooses to answer the call using this projected phone GUI 1307, then the Lamp facilitates the call as if it was a speaker phone using the Lamp's speaker 1303 and microphone 1309.

In other implementations of this invention, a Lamp interacts by RF/wireless with a nearby mobile device that is not in physical contact with the device. The mobile device is recognized by the Lamp's cameras and computer vision. Several detection schemes (e.g., vision-based edge detection, image matching, digital marker on the mobile device, all cross referenced with a wireless signature) are employed in combination to uniquely identify the mobile device. Once the mobile device is identified, a wireless data exchange channel is established. When the channel is open, data may be exchanged between the Lamp system and the mobile device. For example, the Lamp may project a mobile device calendar application on the desktop.

Figure 14:
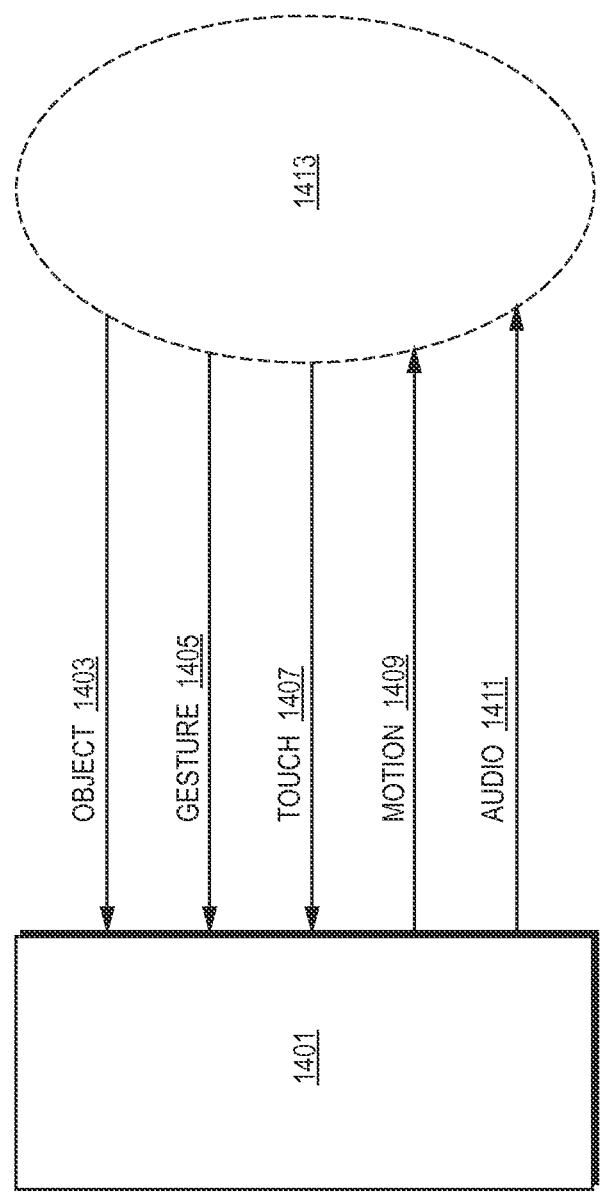
FIG. 14 shows examples of ways in which a Lamp can interact with its environment.

FIG. 14 shows five examples of ways in which a Lamp 1401 can interact with its environment 1413, in an illustrative implementation of this invention. First, the Lamp can engage in object detection and augmentation 1403: the Lamp can detect an object based on a fiducial marker or stored image metadata, and can project images unto (or nearby) an object. For example, the projected images may augment the object with relevant information, or the Lamp may simply use an object as a projection surface in order to project information unrelated to the object. Second, the Lamp can detect and classify hand gestures 1405 and associate them with an instruction. Third, the Lamp can detect and classify user touch 1407 interaction, e.g., when a user touches a projected GUI or grasps the Lamp itself Fourth, the Lamp can use motion 1409 to respond to inputs from a user or to otherwise interact with its environment. For example, the Lamp can move the Bulb in order to project images unto a new projection surface. Or, for example, the Lamp can make a gesture that appears to a human user as sad, happy, etc. In this case, articulated posture of the Lamp is used for UI output (e.g. anthropomorphic and/or animatronic behavior of the Lamp). Also, the Lamp may respond to audio input or give audio output 1411. Furthermore, the Lamp may combine any one or more of this five interaction modalities for a rich texture of interactions.

Figure 15:
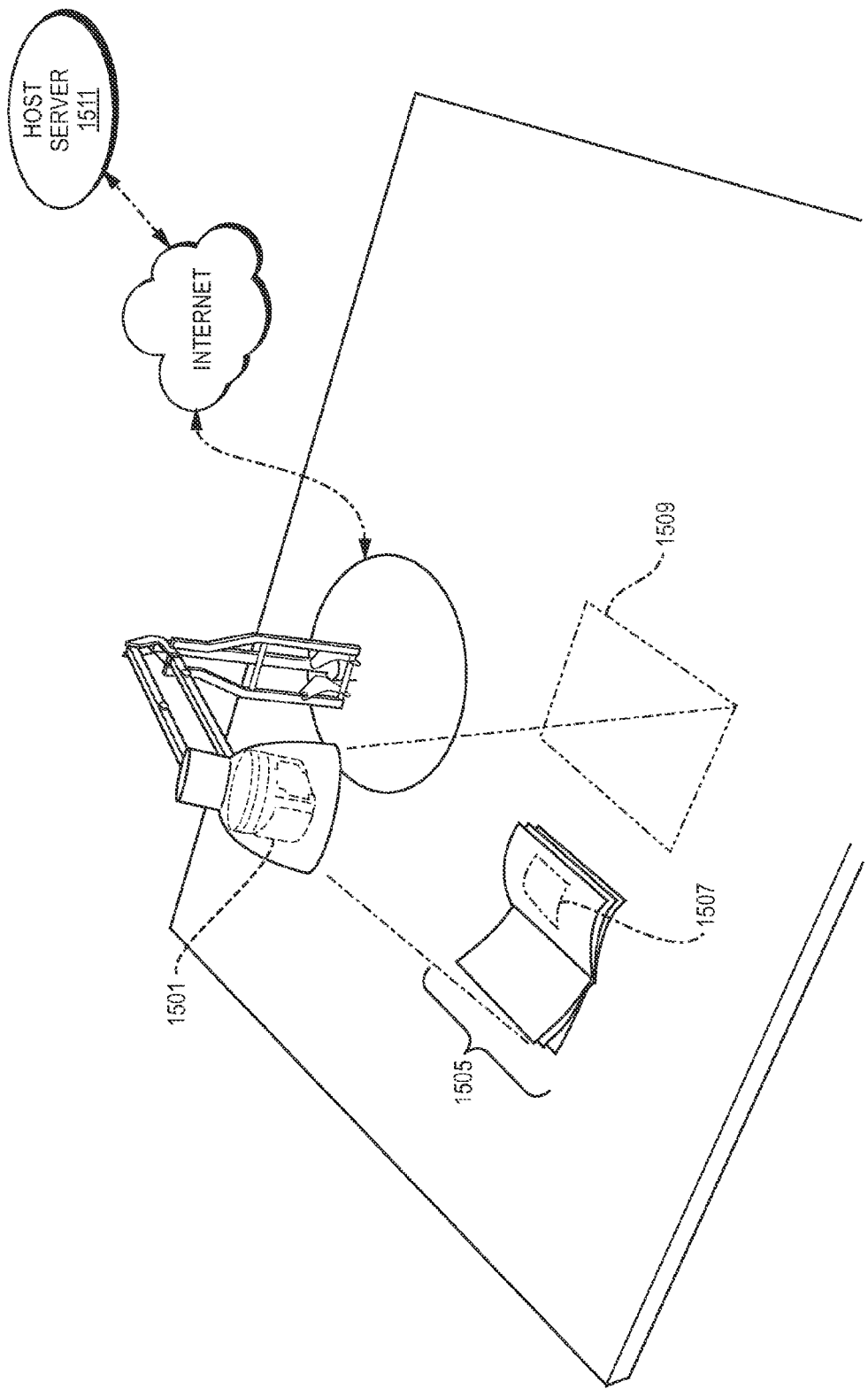
FIG. 15 shows a Lamp being used for an augmented e-store application.

FIG. 15 shows a Lamp being employed in an augmented e-store application, in an illustrative implementation of this invention. In the example, a user places a magazine 1505 in the view area of a Bulb 1501. A page in the magazine 1505 is detected by the Lamp. The Lamp downloads complementing content from a host server 1511 of a website to create an e-store experience where the user can browse and purchase products that relate to the content of the print page in the magazine. This e-store experience comprises a interactive UI that is specifically relevant to a page of the magazine. In this example, the Lamp recognizes an article 1507 printed on the physical page. The article is about a celebrity, and triggers the specific product placement in the UI. The Lamp projects the UI 1509 adjacent to the magazine. The UI 1509 includes additional information and media that complements the story in physical print (e.g., interactive video clips showing the products, advertisement and promotion etc.). A user may trigger a purchase process by touching a certain product. The Lamp retrieves the relevant user interface to support the purchase and determines the best location to project it. Alternately, the Lamp may project a UI partially or entirely on the magazine page, in order, for example, to highlight a physical print ad on the physical page. In that case, if the user touches the highlighted product, the purchase process is triggered.

Figure 16:
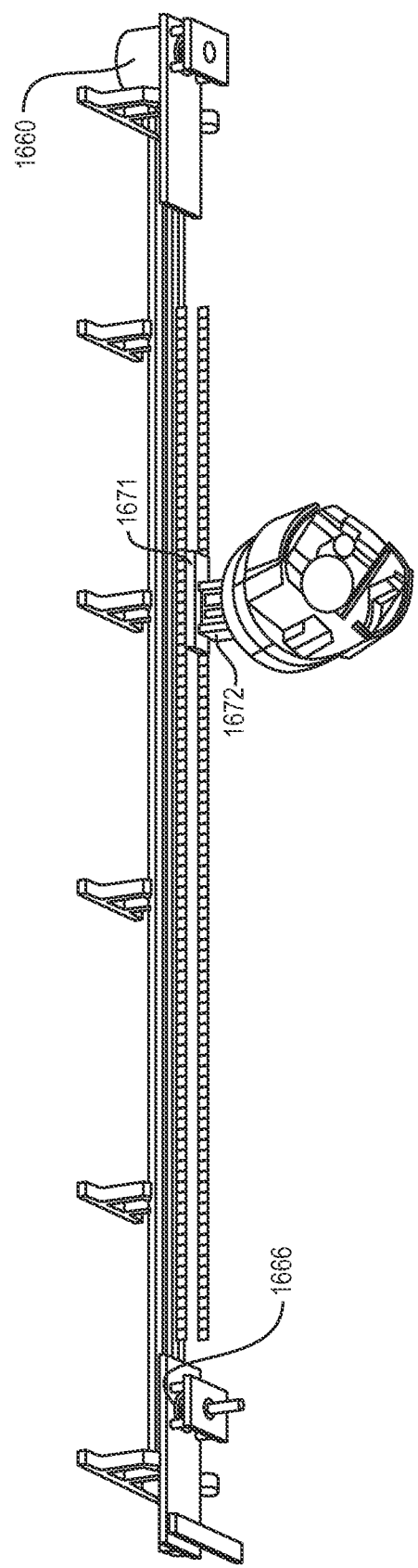
FIG. 16 shows an example of a Bulb on an actuated track, in a "spotlight" implementation of this invention.

FIG. 16 shows an example of a Bulb on an actuated linear track, in a "spotlight" implementation of this invention. In this example, the track is mounted on a ceiling or wall. The Bulb can move in three degrees-of-freedom in this setup due to: (1) linear motion of the belt carriage 1671 along the rail, (2) tilt of the Bulb by a tilt servo 1672 attached to the belt carriage 1671, and (3) rotation of the Bulb about its vertical axis. The linear motion is actuated by a stepper motor 1660 at one end of the track and transmitted through a belt drive. An idler pulley shaft with a rotational encoder 1666 is used to track the carriage position.

In an exemplary embodiment of this invention, Lamp software comprises: (1) robotic middleware (control robot state computation), (2) vision system, object registration and recognition/content detection (OCR, face), motion detection, fiducial markers detection, (3) networking interface and client application, (4) behavior engine, and (5) gestural and multi-touch user interface, detecting fingers hovering or touching the surface.

In some embodiments, a behavior engine is used to enhance the Lamp's user interactions. Such an engine makes use of artificial intelligence and machine learning capabilities. Such an engine can model user preferences. In addition it may support memory mechanisms, as well as physical teaching interfaces to train the lamp to perform a specific behavior.

In some embodiments, a web-based extensible application framework is employed. An extension to JavaScript/HTML allows web pages to become responsive to computer vision and motion-based interactions (including application level code that defines projection parameters such as size, location or scan angle).

The attached Source Code comprises some of the source code used in a prototype of this invention, including: (1) Application Manager, (2) basic vision subsystem capable of fiducial markers recognition and tracking, (3) Vision/UI Engine integration, with the ability to match specific fiducials to specific applications, (4) Email client sample application, (5) paintbrush sample application, (6) MATLAB® inverse kinematics calculation function for the Lamp arm robotic motion, and (7) Lamp arm motor control system settings. This invention may be implemented with a wide variety of source code, in addition (or as an alternate) to the attached Source Code.

In some embodiments, the Lamp's software architecture allows distributed computing. For example, the motor control server can run on one processor, while the vision server or interaction server can run on a different machine.

Figure 17A:
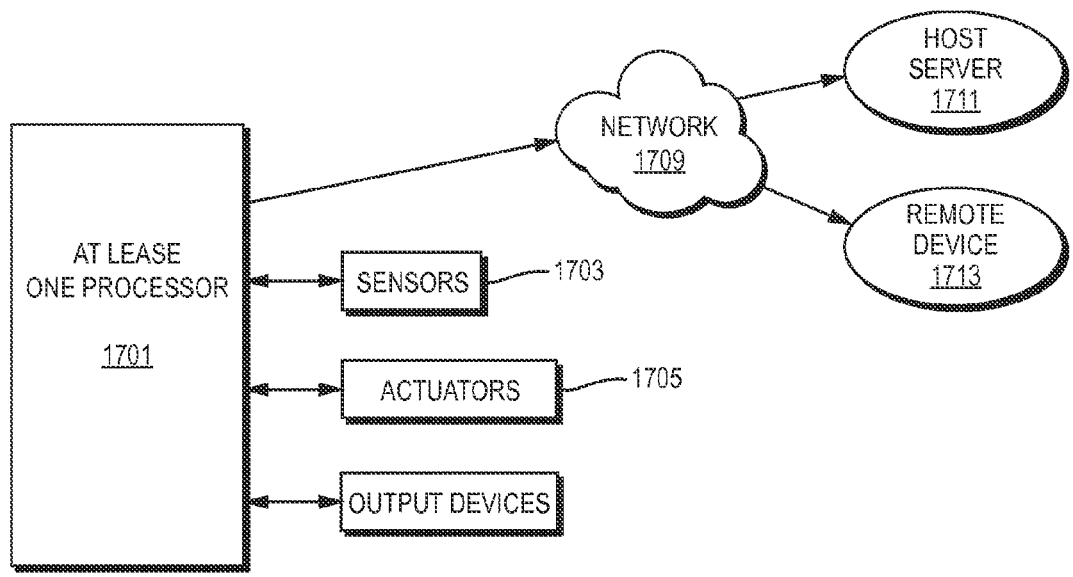
FIG. 17A is a high-level block diagram that shows interactions with at least one processor.

The number of processors used varies, depending on the particular implementation of this invention. For example, one, two, three or more processors may be used. FIG. 17A is a high-level block diagram that shows interactions with at least one processor, in an exemplary implementation of this invention. At least one processor 1701 interacts with sensors 1703 (e.g., cameras, depth sensors, accelerometers, IMUs, and IR sensors), actuators 1705 that move the robotic arm and rotate the Bulb about its vertical axis, and output devices (e.g., pico-projectors, speakers, and IR emitters). In addition, the processor 1701 communicates through a network 1709 with at least one other remote device 1713, including to transmit or receive data. For example, the network 1709 may be the Internet. The processor 1701 may retrieve information from a host server 1711 of a website.

Figure 17B:
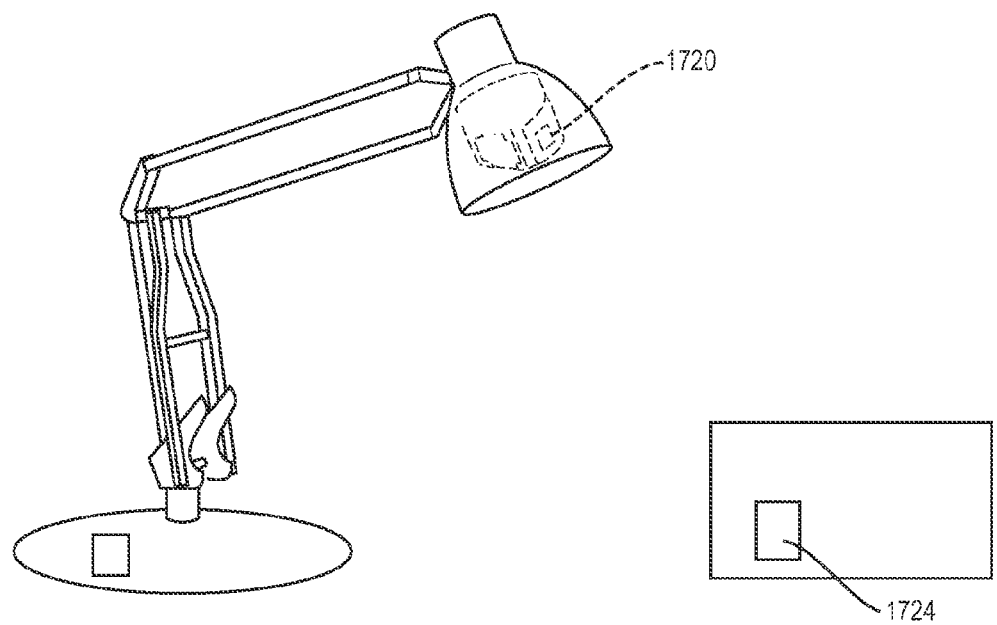
FIG. 17B is a diagram that shows three processors in different locations.

In some implementations of this invention, processing is done by a computer that is onboard the Bulb. Alternately, multiple processors may be used, and some of them may not be housed in the Bulb. For example, FIG. 17B is a diagram that shows three processors: one in the Bulb 1720, one in the base of the Lamp's arm, and in a separate device 1724. The separate device 1724 may be linked to the Lamp by a wired or wireless connection.

Figure 18:
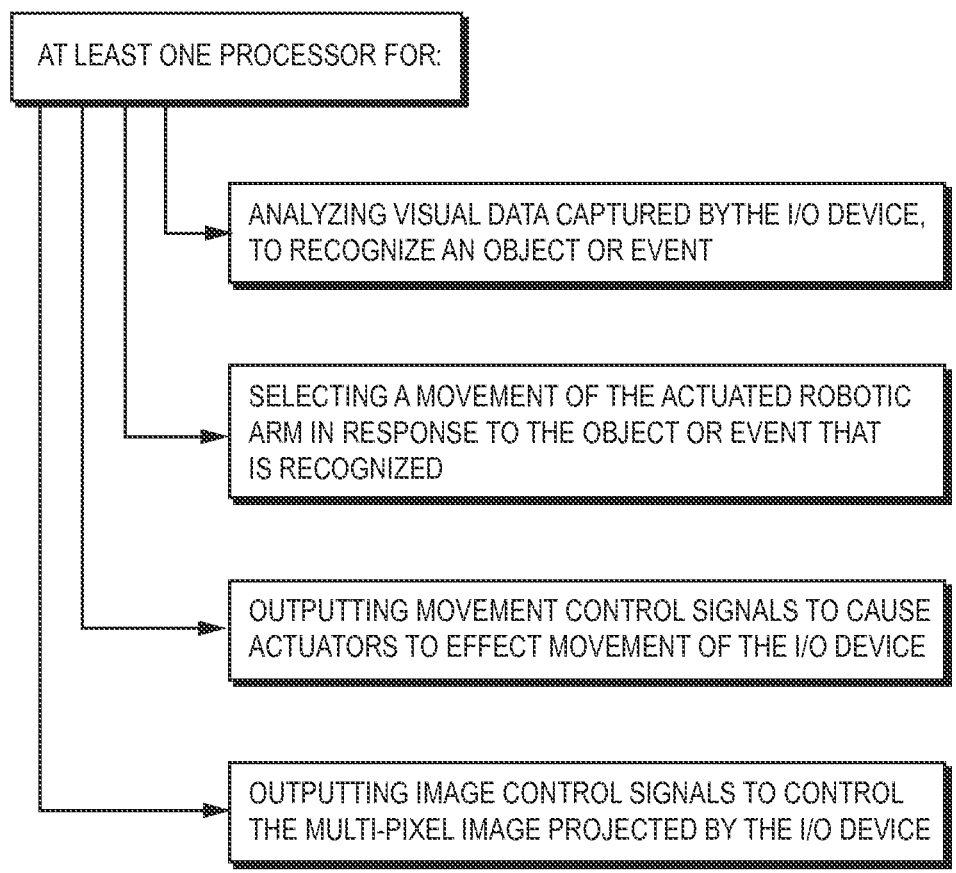
FIG. 18 is a high-level block diagram that shows certain processor functions.

FIG. 18 is a high-level block diagram that shows certain processor functions, in an illustrative implementation of this invention.

In an exemplary embodiment of this invention, the Bulb can track a user and his actions. The Bulb computer module includes wireless networking capabilities that enable it to connect to the web, other information devices and to other Bulbs. In addition to this two-way interaction functionality, the Bulb can also function as a simple light fixture and a webcam.

The Lamp's actuated DOFs (combined with its sensing and projecting capabilities) allow the Lamp to operate as a controlled geometrically aware projector-camera ("PROCAM") system, capable of keystone correction, zoom, focus, orientation and additional automatic calibration aspects. The Lamp can also learn the geometric relationships of the different objects and surfaces in its environment on the fly.

The Lamp may be implemented to support both marker and marker-less object registration and recognition. This approach yields an enhanced user experience. For example, in some embodiments of Lamp, a user may associate a specific notebook placed under the lamp with starting a virtual notepad application.

In an exemplary embodiment of this invention, the Lamp is not hand-held. Thus it leaves the user's hands free to interact.

The Lamp's basic UI subsystem can project multi-touch user interfaces on objects and surfaces, in an illustrative implementation of this invention. This UI subsystem is capable of recognizing fingers hovering and pressing on and above surfaces or objects. Applications can define the relevant interaction areas dynamically during runtime, allowing the system to adapt to various scenarios.

The Lamp may be implemented as a wireless computer that constantly filters and pipes relevant information to the user based on the context and the user model it accumulates through continued use. Once relevant information is available for projection onto the user environment, the Lamp can fully utilize its animatronics capacity and alert the user in a subtle physical fashion. Moreover, it is possible for the system to define and recall several virtual locations that embed specific projected information as defined by the user.

Conventional UI modalities such as sound and graphics can also be added to enhance the experience.

In an illustrative implementation of this invention, a Lamp is aware of other information devices in its environment. Such devices may include laptop computers, mobile phone, TV screens and printers. Essentially, the Lamp can function as a gateway between such devices. According to context the system can suggest and facilitate data transfer across devices. For example, consider an application where the user is able to physically gesture to the Lamp to transfer a document that is currently open on his laptop to the surface next to his screen, yet flat on the desk. This can serve as a virtual stack of documents that is pending, waiting for the user inputs and manipulation.

The user-model and predefined cooperative task scenarios of a Lamp allow users to cooperate with the Lamp to achieve certain tasks, in an illustrative implementation of this invention. In this use case the Lamp may behave as an assistive device. For example, the system can project steps required to complete a certain task (i.e. a wizard).

The Lamp and Bulb may be used for social interactions and remote shared augmented workspaces, in an illustrative implementation of this invention. First, the networking capabilities of the Bulb support standard IP communication of WiFi. The actuated camera DOFs allows users to perform a gesture that invokes a webcam like configuration. For example, two or more Lamps may be connected, thus creating a network of interacting actuated Lamps that enhance the communication medium with gestures, postures and automated speaker focus recognition. These use cases can also be extended to remote collaboration that can share a common workspace projected respectively on two separately located Lamps.

In some embodiments, a Lamp is mounted on a mobile robot. For example, it may be used as a mobile information kiosk, such as a robotic tour guide in a museum. Alternately, a Lamp can be integrated with existing industrial robotic as a user interface sub-system.

A few definitions and clarifications of terms used herein:

The term "Bulb" is not limited to a device in the shape and size of a light bulb but may apply to other form factors also.

The term "comprise" or "comprises" is not exclusive: For example, if A "comprises" B and C, then A includes B and C, and may include other things as well, such as D and E.

A projector "digitally zooms" a projected image when, in response to digital control signals, the projector alters the parameters of its projection so that the projected image would either zoom in or zoom out if the projector remained at a fixed distance from the projection surface. A digital zoom may be combined with a so-called physical zoom (in which zoom is achieved by changing the distance between the projector and the projection surface).

The terms "include", "includes" and "including" shall be construed broadly, as if followed by the words "without limitation".

The term "or" is an inclusive disjunction. For example, "A or B" means either A, or B, or both A and B.

The term "Lamp" is not limited to a device in the shape and size of a lamp but may apply to other form factors also.

The "position" of an object includes not only its displacement along three axes of displacement but also its rotational orientation.

This invention may be implemented in many different ways, in addition to those described above. Here are some examples.

This invention may be implemented as apparatus comprising (a) an articulated arm with actuators for moving an I/O device that is attached to the articulated arm, (b) the I/O device, which I/O device comprises at least one sensor for capturing visual data, and a projector for projecting a multi-pixel image, and (c) at least one processor for (I) analyzing the visual data to recognize an object or event, (II) selecting a movement of the articulated arm in response to the object or event that is recognized, (III) outputting movement control signals to cause the actuators to effect the movement, and (IV) outputting image control signals to control the multi-pixel image. Furthermore, in some cases (including in the case of the apparatus described in the previous sentence): (1) the at least one processor may be adapted (A) to analyze the visual data to recognize an uncluttered surface, (B) to output movement control signals to cause the actuators to move the I/O device nearer to the uncluttered surface, and (C) to output image control signals to cause the multi-pixel image to be projected on an area that is entirely within the uncluttered surface; (2) the event may be a gesture and the at least one processor may be adapted (A) to analyze the visual data to recognize the gesture, (B) to output movement control signals to cause the actuators to effect the movement for a distance, in a direction or with a stopping point indicated by the gesture, the movement being to a new position, and (C) to output image control signals to cause the projector to project, from the new position, the multi-pixel image; (3) the robotic arm may move with at least four degrees of freedom; (4) the apparatus may further comprise a depth sensor for detecting distance from the I/O device to an item in the vicinity of the I/O device; (5) the image control signals may cause the projected image to correct for a keystone effect; (6) the image control signals may control at least the orientation of the multi-pixel image; (7) the at least one processor may be adapted (A) to output movement control signals to cause the actuators to alter the distance between the I/O device and a surface on which the multi-pixel image is being or will be projected, and (B) to output image control signals to digitally zoom the multi-pixel image; (8) the at least one processor may be further adapted to output the motion control signals or image control signals in response, at least in part, to direct physical manipulation of the apparatus; (9) the at least one processor may be further adapted (A) to output control signals to retrieve information from a network, which information is associated with the object or event that is recognized, (B) to accept data indicative of the information, and (C) to output signal control data to cause the multi-pixel image to display content that is based at least in part on the information; (10) the apparatus may be adapted to receive and transmit data to and from a network, the multi-pixel image may comprise a projected graphical user interface, and the at least one processor may be adapted to process the visual data to detect when and where a human user touches a surface on which the projected graphical user interface is projected; (11) the at least one processor may be housed, in whole or part, onboard the I/O device; (12) the at least one processor may perform distributed computing and may comprise two or more processors, at least some of which are remote from each other; (13) the projected graphical user interface may be for displaying an email or other electronic message and for receiving input from a human user to send an email or other electronic message; (14) the projected graphical user interface may be for displaying information about an item for sale and for receiving input from a human user to purchase that item; (15) the apparatus may be further adapted to transmit at least part of the visual data to at least one separate device for display or storage by that at least one separate device, and (16) the at least one separate device may be at least one other apparatus that meets the description of the first sentence of this paragraph.

This invention may be implemented as a process comprising: (a) using an I/O device to capture visual data and to recognize an object or event in the visual data, (b) using at least one actuator to translate the I/O device in a movement that brings the I/O device to a new position that is nearer to the object or that is indicated by the event, and (c) from that new position, using the I/O device to project a multi-pixel image. In this process: the object that is recognized may be an uncluttered surface, the movement may bring the I/O device closer to the uncluttered surface, and the multi-pixel image may be projected on an area that falls entirely within the uncluttered surface.

This invention may be implemented as apparatus comprising (a) actuators for causing movement of an I/O device, which movement comprises translation of the I/O device along a track, tilt of the I/O device relative to the track, and rotation of I/O device about an axis of the I/O device, (b) the I/O device, which I/O device comprises a sensor for capturing visual data and a projector for projecting a multi-pixel image, and (c) at least one processor for (I) analyzing the visual data to recognize an object or event, and (II) outputting signals, in response at least in part to the object or event that is recognized, to control the movement and to control parameters of the multi-pixel image.

Conclusion

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. An apparatus comprising:
   (a) an articulated arm with actuators for moving an I/O device that is attached to the articulated arm;
   (b) the I/O device, which I/O device comprises (1) a plurality of cameras for capturing visual data, and (2) a projector for projecting a projected multi-pixel image; and
   (c) at least one processor for
       (i) analyzing the visual data to recognize an object or event, which object or event is neither the projected multi-pixel image nor distortion of the projected multi-pixel image,
       (ii) selecting a movement of the articulated arm in response to the object or event that is recognized,
       (iii) outputting movement control signals to cause the actuators to effect the movement, and
       (iv) also analyzing the visual data to detect distortion of the projected multi-pixel image and outputting image control signals to correct the distortion;
   wherein the plurality of cameras comprises a first camera and a second camera, the first camera is aligned with the projector, and the second camera is configured to swivel to image objects that are not in a line of sight of the first camera.

2. The apparatus of claim 1, wherein the at least one processor is adapted:
   to analyze the visual data to recognize a planar uncluttered surface,
   to output movement control signals to cause the actuators to move the I/O device nearer to the uncluttered surface, and
   to output image control signals to cause the multi-pixel image to be projected on an area that is entirely within the uncluttered surface.

3. The apparatus of claim 1, wherein the robotic arm can move with at least four degrees of freedom.

4. The apparatus of claim 1, wherein the I/O device further comprises a depth sensor for detecting distance from the I/O device to an item in the vicinity of the I/O device, which distance changes as a result of the movement of the articulated arm.

5. The apparatus of claim 1, wherein the image control signals cause the projector to correct for a keystone effect.

6. The apparatus of claim 1, wherein the image control signals dynamically control projection parameters for homographic calibration of a projection surface with a camera view-port.

7. The apparatus of claim 1, wherein the at least one processor is adapted:
to output movement control signals to cause the actuators to alter the distance between the I/O device and a surface on which the multi-pixel image is being or will be projected, and
to output image control signals to digitally zoom the multi-pixel image.

8. The apparatus of claim 1, wherein the at least one processor is further adapted to output the motion control signals or image control signals in response, at least in part, to direct physical manipulation of the apparatus.

9. The apparatus of claim 1, wherein the at least one processor is further adapted:
to output control signals to retrieve information from a network, which information is associated with the object or event that is recognized,
to accept data indicative of the information, and
to output signal control data to cause the multi-pixel image to display content that is based at least in part on the information.

10. The apparatus of claim 1, wherein
the apparatus is adapted to receive and transmit data to and from a network,
the multi-pixel image comprises a projected graphical user interface, and
the at least one processor is adapted to process the visual data to detect when and where a touch interaction occurs, the touch interaction comprising a human user touching a surface on which the projected graphical user interface is projected.

11. The apparatus of claim 10, wherein the at least one processor is also adapted to process data from a microphone or an accelerometer to detect the touch interaction.

12. The apparatus of claim 10, wherein the projected graphical user interface is for displaying an email or other electronic message and for receiving input from a human user to send an email or other electronic message.

13. The apparatus of claim 10, wherein the projected graphical user interface is for displaying information about an item for sale and for receiving input from a human user to purchase that item.

14. The apparatus of claim 1, wherein the image control signals control projection mapping.

15. The apparatus of claim 1, wherein the apparatus is further adapted to transmit at least part of the visual data to at least one separate device for display or storage by that at least one separate device.

16. The apparatus of claim 15, wherein the at least one separate device is at least one other apparatus that meets the description of claim 1.

17. An apparatus comprising:
(a) an articulated arm with actuators for moving an I/O device that is attached to the articulated arm;
(b) the I/O device, which I/0 device comprises at least one sensor for capturing visual data and a projector for projecting a multi-pixel image; and
(c) at least one processor for
(i) analyzing the visual data to recognize a gesture,
(ii) selecting a movement of the articulated arm in response to the gesture,
(iii) outputting movement control signals to cause the actuators to effect the movement for a distance, in a direction or with a stopping point indicated by the gesture, the movement being to a new position, and
(iv) outputting image control signals to cause the projector to project, from the new position, the multi-pixel image.

18. A process comprising:
(a) using actuators to move an articulated arm and thus an I/O device that is attached to the articulated arm, which I/O device comprises a plurality of cameras and a projector;
(b) using the plurality of cameras to capture visual data
(c) using the projector to project a projected multi-pixel image; and
(c) using at least one processor
(i) to analyze the visual data to recognize an object or event, which object or event is neither the projected multi-pixel image nor distortion of the projected multi-pixel image,
(ii) to select a movement of the articulated arm in response to the object or event that is recognized,
(iii) to output movement control signals to cause the actuators to effect the movement,
(iv) to also analyze the visual data to detect distortion of the projected multi-pixel image, and
(v) to output image control signals to correct the distortion;
wherein
(A) the plurality of cameras comprises a first camera and a second camera,
(B) the first camera is aligned with the projector, and
(C) the process further comprises using servo motors to swivel the second camera to image objects that are not in a line of sight of the first camera.

19. The process of claim 18, wherein the object that is recognized is an uncluttered surface, the movement brings the I/O device closer to the uncluttered surface, and the multi-pixel image is projected on an area that falls entirely within the uncluttered surface.

20. The process of claim 18, wherein the process further comprises:
(a) using the processor to analyze the visual data to recognize an object with a first level of confidence;
(b) translating the I/O device to different spatial positions;
(c) using a camera, out of the plurality of cameras, to capture images of the object from different perspectives when the I/O device is in the different spatial positions; and
(d) using the processor to analyze the images to recognize the object with a second level of confidence, the second level of confidence being higher than the first level of confidence.

* * * * *